(12) United States Patent
Leister et al.

(10) Patent No.: US 8,804,220 B2
(45) Date of Patent: Aug. 12, 2014

(54) METHOD OF COMPUTING A HOLOGRAM

(75) Inventors: Norbert Leister, Dresden (DE); Ralf Häussler, Dresden (DE); Armin Schwerdtner, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 370 days.

(21) Appl. No.: 11/313,989

(22) Filed: Dec. 21, 2005

(65) Prior Publication Data

US 2006/0139711 A1 Jun. 29, 2006

(30) Foreign Application Priority Data

Dec. 23, 2004 (DE) .......................... 10 2004 063 838

(51) Int. Cl.
*G03H 1/06* (2006.01)

(52) U.S. Cl.
USPC ................................................ 359/9; 359/32

(58) Field of Classification Search
None
See application file for complete search history.

(56) References Cited

U.S. PATENT DOCUMENTS

| | | | | |
|---|---|---|---|---|
| 5,760,933 | A * | 6/1998 | Aritake et al. ................... | 359/22 |
| 6,621,605 | B1 * | 9/2003 | Grossetie et al. ................. | 359/9 |
| 6,927,886 | B2 | 8/2005 | Plesniak et al. | |
| 7,315,408 | B2 * | 1/2008 | Schwerdtner ...................... | 359/9 |
| 2004/0021768 | A1 * | 2/2004 | Payne et al. ...................... | 348/51 |
| 2006/0238838 | A1 * | 10/2006 | Schwerdtner ...................... | 359/9 |
| 2006/0238844 | A1 * | 10/2006 | Schwerdtner .................. | 359/32 |

FOREIGN PATENT DOCUMENTS

| WO | 01/95016 A1 | 12/2001 |
|---|---|---|
| WO | 03/021363 A1 | 3/2003 |
| WO | WO 2004044659 A2 * | 5/2004 |

OTHER PUBLICATIONS

U. Schnars, W. P. O. Juptner, 'Digital recording and numerical reconstruction of holograms', Meas. Sci. Technol., vol. 13, Aug. 2002, pp. R85-R101.*
Haist et al., Optics Communications, 140, pp. 299-308 (1997).
Ferri, L.C., Computers & Graphics, 25, pp. 309-321 (2001).
Fukaya et al., Post-Deadline Paper, S36-5, Asia Display '95, pp. 963-964 (1995).

* cited by examiner

*Primary Examiner* — Arnel C Lavarias
(74) *Attorney, Agent, or Firm* — Saul Ewing LLP

(57) ABSTRACT

A method of computing a hologram by determining the wavefronts at the approximate observer eye position that would be generated by a real version of an object to be reconstructed. In normal computer generated holograms, one determines the wavefronts needed to reconstruct an object; this is not done directly in the present invention. Instead, one determines the wavefronts at an observer window that would be generated by a real object located at the same position of the reconstructed object. One can then back-transforms these wavefronts to the hologram to determine how the hologram needs to be encoded to generate these wavefronts. A suitably encoded hologram can then generate a reconstruction of the three-dimensional scene that can be observed by placing one's eyes at the plane of the observer window and looking through the observer window.

23 Claims, 5 Drawing Sheets

$$|A_m|e^{j\frac{k}{2D_m}(x_m-x_0)^2} = |A_m|e^{j\frac{k}{2D_m}x_m^2} * e^{-j\frac{k}{D_m}x_m x_0} * e^{j\frac{k}{2D_m}x_0^2}$$

$$|A_m|e^{j\frac{k}{2D_m}(x_m-x_0)^2} = |A_m|F1_{mn} * e^{-j\frac{k}{D_m}x_m x_0} * F2_{mn}$$

METHOD OF COMPUTING A HOLOGRAM

CROSS REFERENCE TO RELATED APPLICATIONS

This application claims the priority of DE 10 2004 063838 filed on 23 Dec. 2004, the entire contents of which are hereby incorporated in total by reference.

BACKGROUND OF THE INVENTION

1. Field of the Invention

The invention relates to a method of computing a hologram. In particular, it relates to a method of generating holograms using electro-holography. Electro-holography aims at realising computer-generated holograms in real-time (i.e. a reconstructed object can be generated from encoded holographic data in a short space of time). A holographic display typically contains an array of controllable pixels; the pixels reconstruct object points by electronically affecting the amplitude and/or phase of an illuminating light. Such an array is a form of spatial light modulator (SLM). The display may not be array based, but instead be continuous. For example, it may be a continuous SLM, including a continuous SLM with matrix control or an AOM (acousto-optic modulator).

A suitable display device to reconstruct video holograms by spatial amplitude modulation of a light pattern is, for example, a Liquid Crystal Display (LCD). However, this invention can also be applied to other controllable devices, which use coherent light for modulating a light wave front.

2. Definition of Terms and Background Concepts

In this document, the term 'pixel' denotes a controllable hologram pixel in the SLM; a pixel is separately addressed and controlled by a discrete value of a hologram point. Each pixel represents one hologram point of the video hologram. Hence, for a LCD, we use the term pixel to correspond to the individually addressable screen pixels. For a DLP, we use the term pixel to correspond to an individual micro-mirror, or a small group of micro-mirrors. On a continuous SLM, a pixel is a transient region on the SLM that represents one complex hologram point. The term pixel therefore means, at its most general, the smallest unit that can represent (e.g. display) one complex hologram point. To achieve colour encoding, each pixel may comprise sub-pixels for representing or displaying the colour hologram points in each of the three primary colours. Depending on the kind of video hologram encoding, further sub-pixels may be used for encoding or representing the primary colours of each colour hologram point. For instance, if Burckhardt encoding is used for a colour hologram, each pixel needs an arrangement of nine sub-pixels. For better clarity in this document each pixel is encoded by only one discrete hologram point value, containing an amplitude component and a phase component; said components may be zero. A dedicated controller or driver controls the sub-pixels using separate control signals for each sub-pixel. The controller or driver and the provision of control signals is not however the subject of this invention.

The term 'pitch' describes in this document the distance between the centres of two adjacent pixels of a SLM. It thus characterizes the display resolution.

An 'observer window' is a limited virtual zone through which the observer can see the entire reconstructed 3D scene with sufficiently high visibility. The observer window is located at or near the eyes of the observer. The observer window can be moved in the X, Y, and Z directions. Within the observer window, the wave fields interfere in a way that leads to the reconstructed object being visible to the observer. In one implementation of this invention, the scene is viewable through the observer window and is reconstructed inside a frustum that stretches between the edges of the observer window and the SLM. It is possible to include two observer windows, one for each eye. More sophisticated observer window arrangements are also possible. It is also possible to encode video holograms containing objects or entire scenes that the observer can see behind the SLM.

The term 'encoding' describes the way in which the SLM is supplied with control signals so that coherent light passing through the SLM or that is reflected by the SLM, reconstructs a three-dimensional scene.

A 'light source' according to this document is considered sufficiently coherent if the light is spatially coherent to an extent allowing interference, so that it allows holographic reconstruction with an adequate resolution in at least one dimension. Spatial coherence relates to the lateral extent of the light source. Conventional light sources, like LEDs or Cold Cathode Fluorescent Lamps, can also meet these requirements if they radiate light through an adequately narrow aperture. Light from a laser source can be regarded as emanating from a point source within diffraction limits. It leads to a sharp reconstruction of the object, i.e. each object point is reconstructed as a point within diffraction limits.

Light from a spatially incoherent source is laterally extended and causes a blurring or smearing of the reconstructed object. The degree of blurring or smearing is given by the broadened size of an object point reconstructed at a given position. In order to use a spatially incoherent source for hologram construction, a trade-off has to be found between reconstruction quality and brightness by adjusting the aperture width. A smaller aperture results in improved spatial coherence and hence lowers the degree of blurring or smearing. But a smaller aperture results in a lower brightness. The term 'partial spatial coherence' is used to describe such a light source.

Temporal coherence relates to the spectral line width of the light source. In order to ensure temporal coherence, the light must have an adequately narrow wavelength range. The spectral bandwidth of high-brightness LEDs is sufficiently narrow to ensure temporal coherence for holographic reconstruction. The diffraction angle at the SLM is proportional to the wavelength, which means that only a monochromatic source will lead to a sharp reconstruction of an object point. A broadened spectrum will lead to broadened object points and smeared or blurred object reconstructions. The spectrum of a laser source can be regarded as monochromatic. The spectral line width of a LED is sufficiently narrow to facilitate good reconstructions.

In most holographic systems, the encoded hologram is the transform of the 3D scene to be reconstructed. The term 'transform' should be expansively construed to include any mathematical or computational technique that is equivalent to or approximates to a transform. Transforms in the mathematical sense are merely approximations to physical processes more accurately described by Maxwellian wave propagation equations. Transforms such as Fresnel transforms (or the special class of transforms known as Fourier transforms) are second order approximations, but have advantages; because they are basically algebraic as opposed to differential, they can be handled in a computationally efficient manner, also, they can be accurately implemented in optical systems.

3. Description of Related Art

A drawback of 3D-autostereoscopic displays using conventional optics is a mismatch between parallax information and accommodation of the lens of the eye. On the one hand, the observer's eyes see different perspective views of a 3D-scene, which simulate a depth impression of objects at arbitrary distance. On the other hand, each perspective view is located on the display surface itself. Hence, the eye focuses on the display surface, and each eye sees a flat image. That causes a mismatch between seeing objects at arbitrary depth achieved by parallax information and the accommodation of the eyes to a fixed display surface. The mismatch may cause an unpleasant feeling and eye fatigue.

Known electro-holographic displays, for instance as described in document WO 01/95016, use a hologram matrix supplied with a pixel pattern of controllable openings which reconstructs objects of a 3D scene at correct depths. This can avoid the inconvenience of conventional stereoscopic displays. The diffraction from the small openings is used to reconstruct the 3D-scene. The wave fronts emerging from the openings converge in object points of the scene before they reach the observer. The smaller the diameter of openings of this hologram matrix, and thus the pitch, the larger is the diffraction angle. That causes a wide viewing angle for the use by the observer. Consequently, enlarging the viewing angle requires improved resolution.

The document from N. Fukaya, K. Maeno, K. Sato and T. Honda; "Eye-position tracking type electro-holographic display using liquid crystal devices", S36-5, Post-Deadline Paper Asia Display '95 describes a method to expand the viewing zone in an electro-holographic display by eye position tracking. The document suggests that it is not necessary to project light from a holographic array into the whole area where the observer might be located. Rather, it is sufficient to restrict the illuminated area to the observer's eyes. Therefore, a large hologram array is divided into small pieces of separate holograms, each encoded with a pair of small holograms, instead of a single large hologram. That causes an observer to see the same 3-D object as if from one large hologram; each reconstructs the object and its viewing zone corresponds with each eye position. If the observer moves to another position, the observer gets the reconstruction and viewing zone from another pair of small holograms. This restriction facilitates the use of SLMs with significantly lower pixel count.

For tracking the observer's lateral (X,Y) movement, a controllable scanning mirror projects the light of the SLM to the observer's eyes. The tracking of observer's longitudinal (Z) movement occurs by changing the relative space between the small LCDs.

The document mentions a width of the reconstruction of 50 mm, which results in a relatively small angle in which the 3D-scene is rendered.

A disadvantage of this method is that manufacturing a holographic array containing multiple separate small LCDs is very difficult. Further, it has to be avoided that multiple reconstructions of the same object point of a 3D-scene can be seen. That limits the size of the SLM and hence the size of the object.

In order to reduce the enormous number of computations the patent specification WO 01/95016 A1 discloses a hologram calculation of only such parts of an electro hologram that can be seen directly by an observer or such parts that change. The electro hologram array consists of addressable sub-regions. The calculation is founded on a so-called effective exit pupil, which can coincide with the eye pupil of the observer in a specific position. If the observer position changes, a tracking device re-calculates the hologram part that generates the image for the new observer position.

However, this partly nullifies the reduction in the number of computations and the described solution does not avoid the disadvantage to need a large controllable SLM with extremely small pitch.

A device described in Document WO 2003/021363 (A1) for reconstructing computer-generated holograms decreases the requirements on the SLM by restricting the reconstruction to a horizontal-parallax only (HPO) hologram.

The illumination means is a line light source which generates monochromatic light with a bandwidth of less than 10 nm and which is coherent in the horizontal direction but incoherent in the vertical direction. The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in the vertical direction than a full-parallax hologram. There is only a periodicity in the reconstruction direction, i.e. horizontally. The computational load is decreased for one-dimensional line holograms.

The document U.S. Pat. No. 6,927,886 (Plesniak) relates to computed holographic stereograms having a reconfigurable image surface that is spatially distinct from the hologram surface on which the holographic stereogram is encoded. A three-dimensional object or scene is captured or synthesized as a stack of one-dimensional holographic views (HPO-holograms) reconstructed by an array containing so-called holopixels having a structure different from a known pixel structure. Hardware generates computed diffractive patterns to produce viewable images and a generating module reconstructs the holographic stereograms by interference patterns at one or more image surfaces that are spatially distinct from the hologram surface.

The device projects one or more series of parallax views of a three-dimensional scene through one or more holographically reconstructed image planes. Via software, the image plane can be specified at any location off of the hologram plane and populated by a variable number of projector-pixels. Further, in a specific embodiment, the hologram surface and the image surface are separated by an adjustable distance. The image surface may be a variable depth and/or resolution.

In contrast to the pixels of the above-mentioned SLMs the holopixels have a very complicated structure and can reconstruct several holographic views.

Due to a reduction in the observer window to an extension that is just slightly larger than the pupil of an eye, applicant's former patent application WO 2004/044659 reduces significantly the requirements on the pitch of the SLM and the computational load of the holographic array. The device contains at least one light source, which provides sufficiently coherent light, a Fourier-transform lens, and a holographic array with a matrix of pixels that each contain one or more openings. The phase or amplitude of each opening is controllable and an observer plane is located in the image plane of the light source. In the observer plane, at least one observer window is formed in a periodicity interval as a transform of the video hologram, the observer window allowing an observer to observe a reconstruction of a three-dimensional scene. The maximal extent (i.e. X, Y dimensions) of the observer window may correspond to the periodicity interval in the Fourier transformation plane (which is equivalent to the image plane of the light source). A reconstruction frustum stretches between the display area and the observer window, said frustum containing the entire three-dimensional scene of the video hologram. As noted above, the observer window is limited to and positioned in relation to observer's eyes. Appendix II lists further aspects of and enhancements of WO 2004/044659; the enhancements are within the scope of the present invention.

4. Technical Background of the Invention

Common holographic arrays reconstruct a light wavefront of 3D-objects or 3D-scenes by coherent superposition of light waves. For that purpose, a spatial light modulator (SLM) displays a wave pattern encoded on the SLM (which may be a holographic array). The encoded hologram is the transform of the 3D scene. The SLM diffracts the light waves provided by a backlight and reconstructs the scene.

Fundamentally, the displaying of electro holograms, in which the holograms are sampled in hologram points, leads to a problem. Sampled holograms always have the property of periodic repetitions of the encoded wave pattern in periodicity intervals in the observer plane. These repetitions will cause multiple reconstructions of the same object or object points.

If the dimension of the reconstruction of the hologram exceeds the periodicity interval, adjacent diffraction orders will overlap. As the resolution is gradually decreased, i.e. as the pitch rises, the edges of the reconstruction will be distorted increasingly by overlapping adjacent diffraction orders. The usable extent of the reconstruction is thus gradually limited, because an overlapping of periodical reconstructed observer windows has to be avoided.

The viewing zone of a SLM depends on its maximum diffraction angle. The maximum is defined by the pixel pitch of the SLM.

As is generally known, in Fourier holograms the scene is reconstructed in a reconstruction plane as a direct or inverse Fourier transform of the encoding of the pixels of the holographic array (i.e. object reconstruction is at the Fourier plane of the array). This reconstruction is continued periodically at a periodicity interval, the extent of said periodicity interval being inversely proportional to the pixel pitch in the holographic array.

If larger periodicity intervals and thus greater viewing angles are to be achieved, the required pitch (and so the extent of sub-pixels of each pixel in the holographic array) comes closer to the wavelength of the illuminating light. The array area must be sufficiently large in order to be able to reconstruct large scenes. These two conditions (small pitch and large area) require a large holographic array having a great number of pixels.

For rendering the reconstructions of electro holograms, a sufficiently large viewing zone must be provided. In conventional holographic arrays, the viewing zone has to cover at least the eye separation, which requires a pixel pitch of ca. 10 µm at most. Costly hardware and high computational speeds are needed to calculate the electro-hologram in real-time.

The computational load on equipment that generates holograms in real time depends on the complexity of the holograms. A full-parallax hologram reconstructs an object holographically by coherent superposition of waves in the horizontal and vertical directions. Given a sufficiently large observer window or observer region, the reconstructed object can be seen with motion parallax in the horizontal and vertical directions, like a real object. However, a large observer region requires a high resolution SLM in both horizontal and vertical directions.

The requirements on the SLM and the computational device (e.g. dedicated ASIC, main device CPU, separate stand-alone device etc.) can be reduced by restriction to a horizontal-parallax only (HPO) hologram or a vertical-parallax only (VPO) hologram.

If a horizontal-parallax only hologram is used, the holographic reconstruction takes place only in the horizontal direction and there is no holographic reconstruction in the vertical direction. This results in a reconstructed object with horizontal motion parallax. The perspective view does not change upon vertical motion. A HPO hologram requires less resolution of the SLM in vertical direction than a full-parallax hologram. There is only a periodicity in the reconstruction direction, i.e. horizontally. The computational load is therefore decreased for one-dimensional line holograms.

A vertical-parallax only hologram where the reconstruction takes place only in the vertical direction is also possible but uncommon. This results in a reconstructed object with vertical motion parallax. There is no motion parallax in the horizontal direction. The different perspective views for the left eye and right eye have to be created separately. This can be done by temporal or spatial multiplexing of the observer windows.

Both VPO holograms and HPO holograms accomplish eye focussing (i.e. adapting the eye lens curvature) at the object distance.

It is common practice that the observer window of conventional electro-holographic displays is much larger than the pupil of the eye (i.e. that the reconstructed object can be seen correctly over a large area). A consequence is that much effort is needed to project light into regions of the space where no observer is located. Therefore, the performance required for the whole electro-holographic displays to control the optical wave front is extremely high.

Given a sufficiently large observer window or observer region, the reconstructed object facilitates motion parallax in horizontal and vertical direction, like a real object. However, a large observer region requires high resolution in both horizontal and vertical direction of the holographic array.

One known method to encode a hologram is by using a conventional liquid crystal display that modulates the amplitude by known Burckhardt encoding which is based on the detour-phase effect. The encoding needs three neighbouring sub-pixels per pixel and primary colour. This encoding provides three categories of diffraction orders called $-1^{st}, 0^{th}, 1^{st}, 2^{nd}, 3^{rd}$, etc. diffraction order. The first category, the $0^{th}, 3^{rd}$, etc. diffraction order contain un-diffracted light. These orders do not provide any reconstruction. The second category, the $1^{st}, 4^{th}$, etc. diffraction order contains the reconstruction of the encoded object. In contrast, the third category, the $-1^{st}, 2^{nd}$, etc. diffraction order contains the reconstruction of a depth-inverted object. That means this reconstruction is incorrect. A correct reconstruction contains the $1^{st}, 4^{th}$, etc. diffraction orders only. Due to the finite aperture of the LCD openings, the intensity of the diffraction pattern falls off towards higher diffraction orders. Therefore, it is advantageous to locate the observer window in the $1^{st}$ diffraction order.

A periodicity interval provided by Burckhardt encoding comprises a group of three adjacent diffraction orders, like the $1^{st}, 0^{th}$ and $-1^{st}$ diffraction order. The size of each periodicity interval is given by $P_{diffr} = \lambda*d/p$, where $\lambda$ defines the wavelength of the illumination light; d is the distance between hologram and observer plane, p is the sub-pixel pitch.

As the object is reconstructed correctly in the $1^{st}$ diffraction order only, the observer window can cover ⅓ of the periodicity interval $P_{diffr}$ only. Because the size of the periodicity interval depends on the wavelength of the illumination light too, for colour holograms the size of the observer window is limited by the shortest wavelength of the primary colour that is used.

If a phase-modulating SLM is used in a Fourier hologram, the periodicity interval contains no depth-inverted reconstruction of an object. However, there is also un-diffracted light. Therefore, not the whole periodicity interval can be used as an observer window. The un-diffracted light has to be excluded from the observer window also.

If a complex-modulating SLM is used, each single pixel can be used to encode one complex value. Therefore, each periodicity interval in the observer plane contains only one diffraction order. Hence, the whole periodicity interval can be used for an observer window.

In general, the observer window has to be located within one periodicity interval; however, depending on the encoding method of the complex-valued hologram on the SLM the observer window has to be smaller than a periodicity interval.

The propagation of light caused by an electro-hologram can be described by Fresnel transforms or Fourier transforms. Fresnel transforms describe the near-field light distribution whereas Fourier transforms describe the far-field light distribution at infinite distance. The far-field light distribution can be shifted to a finite distance by a focussing lens.

The solution known from patent application WO 2004/044659 is based on the idea to limit this encoded area such that light emanating from reconstructed scene points is confined to one observer window. Therefore, the device reconstructs a video hologram in one periodicity interval of the Fourier transform in an observer plane. The reconstructed three-dimensional scene can be observed through an observer window located in front of each eye. The reconstructed scene is visible inside the reconstruction frustum; the scene can thereby be reconstructed on, in front of or behind the array surface. This allows the use of a conventional array with resolution near 3 million pixels at reasonable hardware expenses and computing power.

SUMMARY OF THE INVENTION

It is an object of this invention to reduce the computational requirements of computing a hologram. It is a further object to realize an electro-holographic display for reconstructing video holograms using a SLM with a conventional resolution; the holograms should provide a high quality reconstructed image.

In order to achieve this object, an invention as defined in the appended claims is provided. The invention is a method of computing a hologram by determining the wavefronts at the approximate observer eye position that would be generated by a real version of an object to be reconstructed. In normal computer generated holograms, one determines the wavefronts needed to reconstruct every point in an object. This can be very computationally intensive. This is not done directly in the present invention. Instead, with the present invention, one may determine the wavefronts at an observer window that would be generated by a real object located at the same position of the reconstructed object. One can then back-transform these wavefronts to the hologram to determine how the hologram needs to be encoded to generate these wavefronts.

Although apparently more complex than the conventional approach of directly working out how the hologram needs to be encoded to generate each point of a reconstructed object, the present invention does enable computational approaches that are very efficient. For example, one can apply a Fresnel transform for all of the reconstructed object points to the observer window; one can then add together the wavefronts at the observer window and then apply a single Fourier transform back to the hologram plane itself to define the hologram points on the hologram that are needed to reconstruct the object. Further, this approach leads to a small observer window if low-resolution SLMs are used. The small observer window does not however matter if it is larger than the eye pupil and if the eye pupil is properly tracked.

This computational method can take place when holographic data is being processed at a user's display device (e.g. an ASIC in the display device) or in a computational unit connected to the display device. Hence the display device (or connected computational unit) receives holographic data (e.g. on an optical recoding medium, or over a high bandwidth network etc.) that can be processed locally by the display or computational unit. This typically requires some way of tracking the observer's eyes (or the eyes of several observers) in real time so that the hologram can be computed in real time from the holographic data; this real time computed hologram is then illuminated using an optical system in such a way that an object is holographically reconstructed. The holographic data will, in the case of a video hologram, be changing over time; it is regularly and rapidly processed many times a second in a way that is a function of the positions of the observer(s)' eyes.

A suitably encoded hologram can then generate a reconstruction of the three-dimensional scene that can be observed by placing one's eyes at the plane of the observer window and looking through the observer window.

The present invention preferably uses a device described in applicant's former patent application WO 2004/044659 where sufficiently coherent light, imaged by optical focusing means, passes through controllable pixels of a single holographic array (or other form of SLM) into at least one observer window, each being located in one periodicity interval of an observer plane (known also as a reference layer) near the eyes of an observer. This reconstructs a scene that has been holographically encoded by the controllable pixels and thus renders it visible through the observer window. A frustum stretches between the holographic array and the observer window. In contrast to common known devices, the frustum contains a reconstruction of the entire three-dimensional scene encoded on the holographic array.

The extent of the observer window (i.e. in the x and y directions) is no larger than the periodicity interval in the layer or plane which contains the image of the light source used for reconstruction. This leads to the effect that the video hologram according to this implementation needs smaller diffraction angles compared with other solutions, all the more if the data sets for the reference layer and for the hologram layer have the same number of matrix point values. Thanks to the computation of amplitude values for the light modulator matrix, the demands on processing speed are greatly reduced. In particular in conjunction with a known position detection and tracking device for tracking the current observer position, the dimension of the observer window can be greatly minimised to benefit from this advantage. Annex I includes more details of this implementation.

In the present invention, the light from the light source is focussed to the observer plane located near to observer's eyes. Therefore, in the observer plane there is the Fourier transform of the hologram: the observer window is hence also the Fourier transform of the hologram. The reconstructed object is not the Fourier transform of the hologram but the Fresnel transform, as the reconstructed object is not in the focus plane of the lens. The reconstructed object, i.e. the Fresnel transform of the hologram, is located in the frustum defined by hologram and the observer window.

The occurrence of multiple object reconstructions can be avoided by limiting the hologram region on which the scene information is encoded on the holographic array for each sample point of the holographic reconstruction. By encoding the video hologram on a restricted region of the holographic array, the reconstruction of the observer windows has to be limited to an extent and a location arranged inside of that diffraction order of one periodicity interval that can show the correct and complete reconstruction of the encoded holographic scene.

The observer window has to be located within one periodicity interval only, however depending on the encoding method used, the observer window has to be smaller than the periodicity interval. For instance, if Burckhardt encoding is used, this can be a one-third part of the periodicity interval defined by the shortest wavelength of the primary colour used. The selection of the resolution of the electro-holographic display and its encoding restricts the size of the observer windows in relation to an eye size of an observer and positions the windows to the eye positions by known eye tracking means.

The invention is not limited to encoding Fourier holograms. However, there is an advantage of Fourier holograms compared to Fresnel holograms. As no hologram has 100% efficiency, there will always be undiffracted light. In a Fourier hologram, undiffracted light is focussed to a spot in the observer plane. If this spot is outside the observer window the undiffracted light is not visible and hence does not disturb. In a Fresnel hologram, the undiffracted light is not focussed and is therefore visible as a disturbing background.

An implementation of the invention provides a computer generated hologram comprising regions that encode digitalized encoding information needed to reconstruct a holographic image that is visible from a defined observer position. The encoding information of each single object point in the reconstructed scene is encoded solely in a restricted region of the SLM. Each encoded restricted region can carry encoding information from other adjacent object points, so that the regions of different other adjacent object points overlap each other. For each object point, the region with encoded information is restricted in size to form a small portion of the entire video hologram, the size being such that multiple reconstructions of that point caused by higher diffraction orders are not visible at the defined observer position.

In conventional electro-holographic displays the hologram is calculated as the Fourier Fresnel transform of the objects. This leads to a small object size if low-resolution SLMs are used.

In contrast, according to an implementation of the invention, the hologram is calculated as the Fourier transform of the observer window. This leads to a small observer window if low-resolution SLMs are used, but the reconstructed three-dimensional scene can extend to the entire space of the frustum. Implementations of the present invention include also the concepts and features defined in Annex III.

The invention can be implemented as:
- a data carrier programmed with holographic data, when used in combination with a device that can compute a hologram from that data using the methods disclosed herein.
- a data distribution network when carrying holographic data that can be processed by a device to compute a hologram using the methods disclosed herein.
- a computing device adapted to compute data defining a video hologram using the methods disclosed herein.
- a display screen when displaying a hologram computed by the methods disclosed herein.
- a holographic reconstruction from a hologram computed by the methods disclosed herein.

Other implementation features include the hologram being encoded onto a display in a television, a multimedia device, a gaming device, a medical image display device, a military information display device. The display can be a TFT flat screen SLM.

BRIEF DESCRIPTION OF THE DRAWINGS

Further aspects of an embodiment with regard to a video hologram and a device for reconstructing video holograms are illustrated and explained in Annex II in conjunction with the accompanying drawings, wherein.

DETAILED DESCRIPTION OF THE INVENTION

A device for reconstructing video holograms comprises a SLM (which in this example is a holographic array HA), a sufficiently coherent light source LS and an optical focussing system F. The light source can be realized by virtual illumination means, e.g. a LED array or a line shaped backlight locally controlled and directed by controllable shutter means to form an array of point or line light sources. The holographic array itself consists of pixels which are arranged in a regular pattern; each pixel contains a number of illuminated and transmissive openings (sub-pixels). The openings of each sub-pixel are separately addressable and controllable in phase and/or amplitude to influence the passing illumination light to be encoded via holographic complex valued numbers representing the sequence of a video hologram.

In the observer plane OP at least one observer window OW is formed in a periodicity interval as a direct or inverse Fourier transform of the video hologram. The observer window OW allows an observer eye OE to view a reconstruction 3D-S of a three-dimensional scene. The maximal extent of the observer window OW corresponds to the periodicity interval in the observer plane OP of the Fourier back transformation, which is identical with the image plane of the light source LS.

In the preferred embodiment of the invention, information about a three-dimensional scene is encoded in a transmissive SLM, HA. The illuminated pixel-arrangements contain several openings (sub-pixels for a colour display). Spatial control of the amplitude and phase of the illuminating light is achieved by the encoded pixel pattern. However, the basic idea of the invention is not limited to the described SLM. Both transflective and reflective arrays or arrays that directly modulate the phase of the light waves, such as Freedericksz pixels, may be used.

FIG. 1

Figure 1:
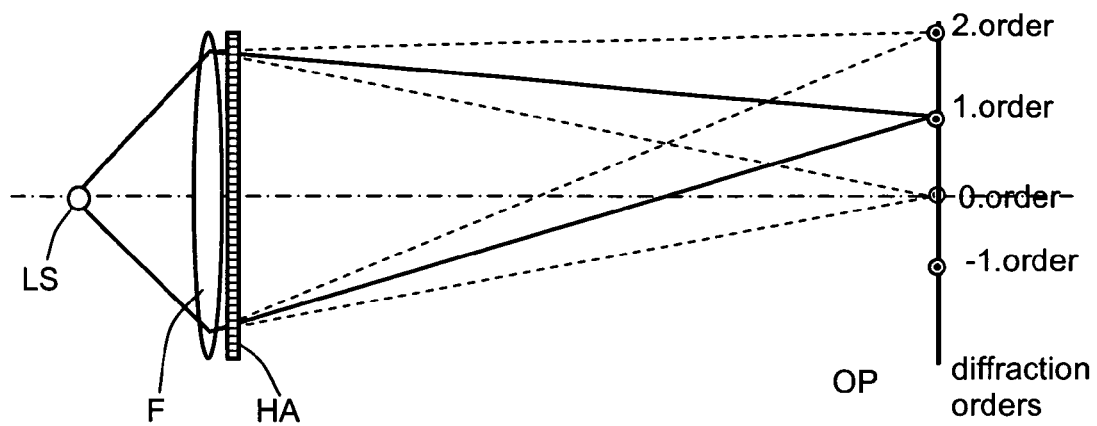
FIG. 1 is a top view of a general illustration of a device for reconstructing video holograms, showing the generation and arrangement of the diffraction orders when the Burckhardt encoding is used.

FIG. 1 shows a light source LS that illuminates via focusing means F a SLM, the array HA. In the best mode embodiment of the invention, a line shaped light source forms the light source LS and the focusing means F is a vertically disposed cylindrical lens that images the coherent light of light source LS into an observer plane OP.

FIG. 1 shows a device that uses the known Burckhardt encoding. The observer plane OP corresponds with the Fourier plane of the back transform of the video hologram with diffraction orders.

The light source LS is imaged in the observer plane OP through the focusing means F, representing a Fourier transform lens. The SLM, HA, encoded with a video hologram, reconstructs the hologram in the observer plane OP as a Fourier back transform. The periodic openings of the SLM HA create equidistantly staggered diffraction orders in the observer plane OP, where the holographic encoding into higher diffraction orders takes place, e.g. by way of the so-called detour phase effect. Because the light intensity decreases towards higher diffraction orders, the $1^{st}$ or $1^{st}$ diffraction order is used as the observer window OW shown in FIG. 2. The dimension of the reconstruction was chosen here to correspond with the dimension of the periodicity interval of the $1^{st}$ diffraction order in the observer plane OP. Consequently, higher diffraction orders are positioned together without forming a gap, but also without overlapping.

FIG. 2

Figure 2:
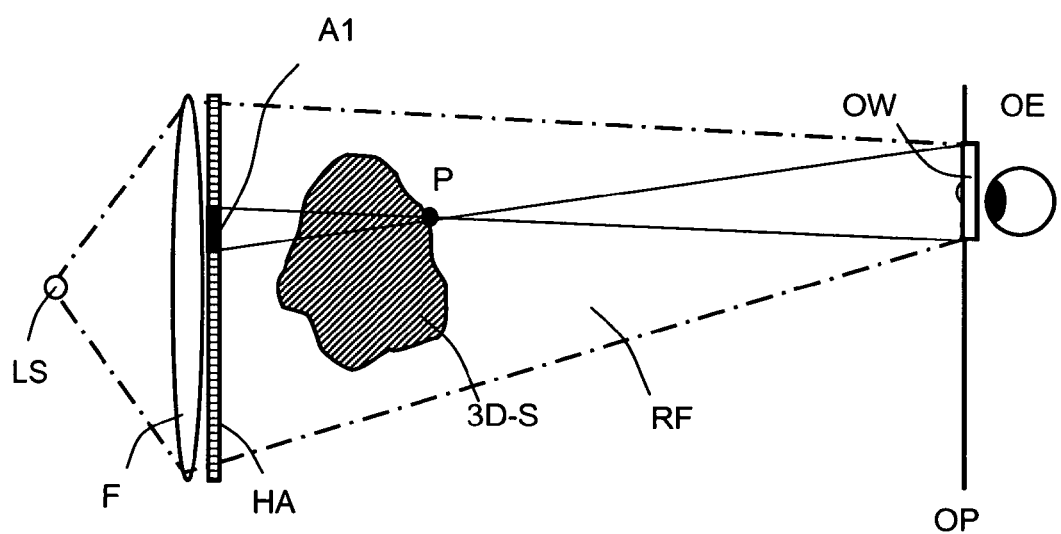
FIG. 2 is a general illustration of a device in top view for reconstructing video holograms, showing the encoding of a single object point of a three-dimensional scene which can be viewed through a observer window.

As shown in FIG. 2, the selected $1^{st}$ diffraction order at the observer plane OP is the reconstruction of the video hologram. It is not the reconstruction of the object itself, but instead is the wavefront at the observer window OW that would be generated by a real object located at the same position as the reconstructed object. Hence, that video hologram reconstruction (i.e. not the object reconstruction) does not represent the actual three-dimensional scene 3D-S. It is only used as the observer window OW through which a reconstruction of the three-dimensional scene 3D-S can be observed. The scene is located inside a reconstruction frustum RF which stretches between the SLM and the observer window OW. The scene 3D-S is rendered as the Fresnel transform of the video hologram, whereas the observer window OW is a part of the Fourier transform. FIG. 2 shows a holographic encoding of the SLM HA by a single object point P of the 3D-scene. In a conventional holographic reconstruction, the $1^{st}$ diffraction order would itself constitute the reconstruction of the object. The reconstructed object would be at the Fourier plane. In the FIG. 2 implementation, the observer plane co-incides with the Fourier plane.

FIG. 2 shows the corresponding holographic encoding. The three-dimensional scene is composed of discrete points, e.g. the points P1 to P3 (see FIG. 3). The pyramid PY with the observer window OW being the base and the selected point P in the scene 3D-S being the peak, is prolonged through this point and projected on to the SLM HA. A projection region A1 is created in the video hologram, that point being holographically encoded solely in the projection region A1. The distances between the point P to the pixels of the hologram can be determined in order to calculate the phase values. This reconstruction 3D-S is larger than the observer window.

The size of the observer window OW is constrained by the periodicity interval. In conventional holographic reconstructions, the periodicity interval constrains the size of the reconstructed object; that does not apply to the present implementation. As a consequence, this implementation allows much larger reconstructed objects to be generated than would be possible using a conventional holographic approach with a display having the same pixel pitch. A reconstructed object can appear anywhere inside reconstruction frustrum RF.

If the point P was encoded in the entire hologram, the reconstruction would extend beyond the periodicity interval. The viewing zones from adjacent diffraction orders would overlap, which would result in the viewer seeing a periodic continuation of the object point P. The contours of a thus encoded surface would appear blurted due to multiple overlapping.

FIG. 3

Figure 3:
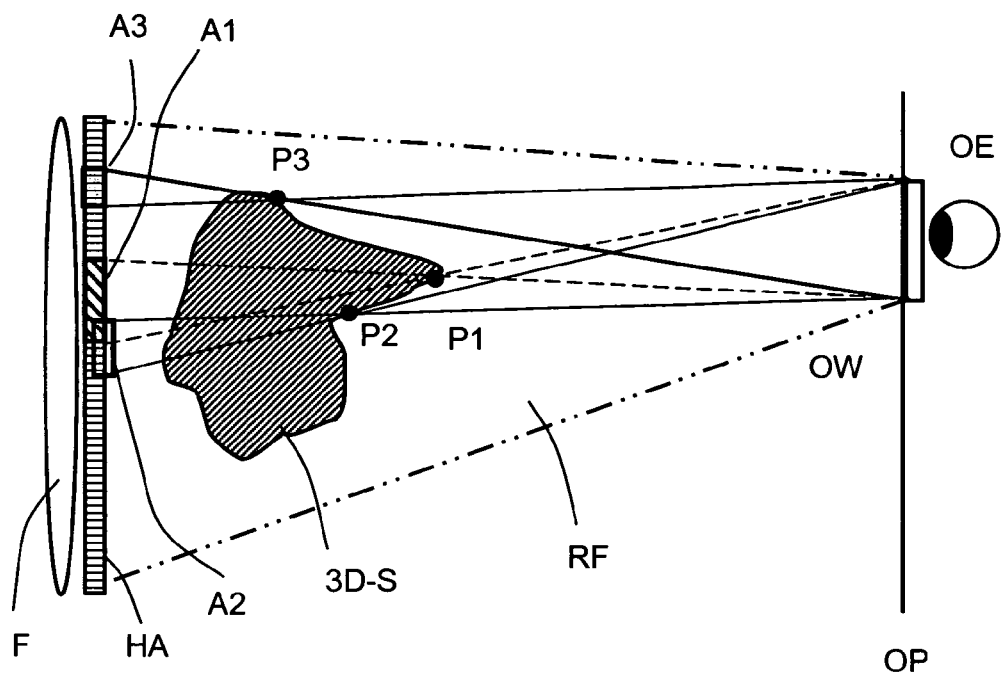
FIG. 3 is a general illustration of a device for reconstructing video holograms, showing several object points of encoding the three-dimensional scene in a part of the video hologram.

FIG. 3 shows an encoding of a three-dimensional scene 3D-S, having the object points P1 to P3. As shown each object point P1 to P3 is solely encoded in a corresponding restricted encoding region of the SLM HA only. These regions are defined by the reference numbers A1 to A3. The position of the object points P1 and P2 differ in depth information. Therefore, on the SLM both encoding regions A1 and A2 do overlap.

FIG. 4

Figure 4:
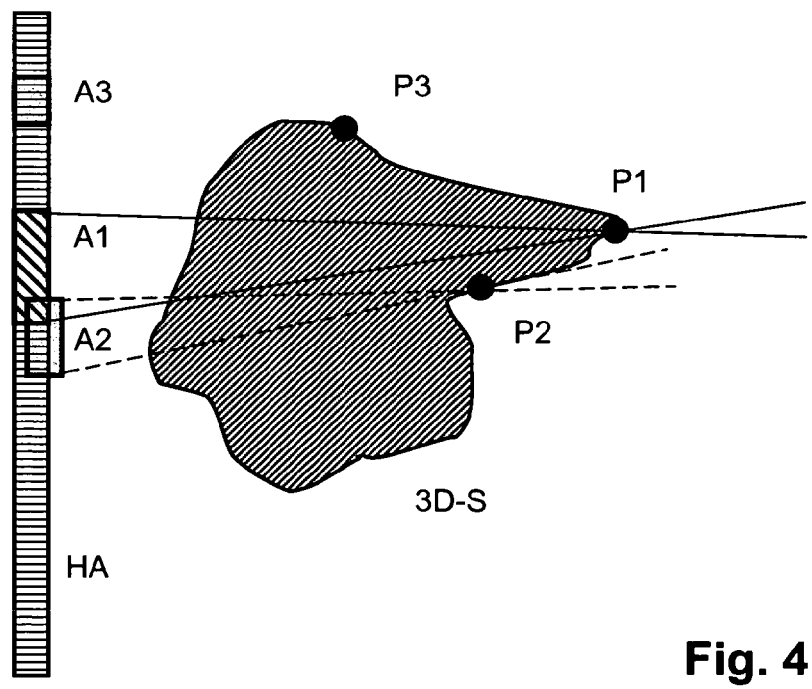
FIG. 4 shows the same device as in FIG. 3, but having a higher resolution.

FIG. 4 shows the FIG. 3 situation in greater detail.

The light source LS is imaged to the observer plane OP. The lens F or a lens array images light source LS. Compared to a Fresnel hologram, the Fourier hologram has the advantage that undiffracted light is focused to small spots in the observer plane OP. If these spots are outside the observer window, the undiffracted light is not visible as disturbing background.

In the case of a coherent light source, the size of the imaged light source is limited by diffraction and aberrations at the lens and is usually very small compared to the resolution of the human eye. If a spatially incoherent source, like a LED or a LED array is used, the size of the imaged light source is also determined by the aperture of the light source and the magnification of the lens.

In a preferred embodiment of the invention, an array of light sources and an array of lenses is used, the images of all light sources have to coincide. This means that the pitch of the light source array has to be slightly larger than the pitch of the lens array, according to a simple geometrical construction. If the sources and lenses are properly aligned, a diffraction pattern is visible in the observer plane OP which looks like the diffraction pattern as if a single source and a single lens was used.

There may be additional optical elements which shape the light distribution in order to homogenize the light distribution or increase the intensity in the observer plane. These may be diffuser sheets or lenses.

For a pure holographic setup, tracking of the observer is achieved by shifting the light source(s) relative to the lens (array). This may be done by mechanically shifting the source(s) or the lens (array) or by electronically shifting the apertures on the shutter LCD panel. Tracking might also be done by a configurable diffractive optical element or a scanning mirror.

If holographic object reconstruction in the vertical direction and autostereoscopic image separation in the horizontal direction are combined, tracking in the horizontal direction can also be done by horizontal shifting of the VPO hologram on the SLM.

The following annexes are appended:

Annex I: A detailed description of another embodiment of the present invention

Annex II: Theoretical background; detail and enhancements to the preferred embodiments Annex III: A summary of key concepts from, and enhancements to, WO 2004/044659, the contents of which are incorporated by reference.

Annex I

Further Embodiment with Regard to a Method and Device for Computing Computer-Generated Video Holograms Annex I: Background of the Embodiment The present embodiment relates to a method and device for computing computer-generated holograms (CGH), especially real-time or near real-time holograms, e.g. video holograms, which are made up of individually controllable hologram cells; each cell displays complex-valued data. Besides stills, real-time video holograms are of particular interest. Electro-holography aims at a realization of CGH in real-time. The electro-hologram display is effectively a Spatial Light Modulator (SLM) with controllable pixels reconstructing object points by spatial modulating an illuminating light. Throughout this specification, we will refer to real-time holograms as video holograms. For those skilled in the art, video holograms also cover Optically Addressable SLMs, Acousto-Optic light Modulators (AOM) or the like which do not exhibit separately arranged cells.

In contrast to classic holograms, which are stored photographically or in another suitable way in the form of interference patterns, video holograms exist as a result of a computation of discrete hologram data from sequences of a three-dimensional scene. During the computation process, the intermediate data is stored, for example, by electronic means, such as an electronic storage medium of a computer, graphics processor, graphics adapter or other hardware component. The 3D scene data can be generated in any way, e.g. by interference patterns or 3D conversion of 2D data.

Annex I: Background Concepts

Spatial Light Modulators (SLMs) are devices for spatially controlling the complex-valued data, i.e. the magnitude and phase of the amplitude of each colour component of light. The colour can be encoded by being spatially or temporally multiplexed. The SLM may contain controllable hologram cells, each being separately addressed and controlled by a discrete value set of hologram data. SLMs can also be continuous and not contain discrete cells. To achieve colour encoding by spatial multiplexing in a cell based SLM, each pixel in a cell may comprise colour sub-pixels, each sub-pixel displaying one of three or more primary colours. Depending on the kind of video hologram encoding used, further sub-pixels may be used for encoding each of the primary colours. For instance, a detour phase encoding, like the known Burckhardt encoding, needs an arrangement of three sub-pixels for each colour component. Taking into account three colour components, the number of sub pixels totals to nine for a hologram cell (i.e. there are three primary colours; there are three sub-pixels for each of these three primary colours, making nine sub-pixels in total. In contrast, the also known Lee encoding requires four sub pixels; and a two-phase encoding requires two sub pixels for each colour in a hologram cell.

Each hologram cell is encoded by one discrete set of hologram data containing at least amplitude and phase information of a given colour component; said data may be zero or have a standard value or may be arbitrarily chosen. The hologram data of a video hologram is continuously updated according to the scheme driving the SLM. Since the entire hologram is made up of thousands of cells, there are thousands of discrete sets of hologram data.

A hologram data set contains all the information necessary to encode one single video hologram cell as part of a time sequence to reconstruct a three-dimensional scene.

A dedicated driver uses the discrete hologram data sets to provide the specific control signals for controlling the corresponding sub-pixels of the SLM. The driver and the provision of control signals are specific to the type of the SLM used and is not the subject of this embodiment. Many kinds of SLMs, like transmissive or reflective liquid crystal displays, micro optical and electro mechanical micro systems or continuously optically addressed SLMs and acousto optic modulators can be used in combination with this embodiment.

The modulated light emerges from the hologram with the amplitude and phase appropriately controlled and propagates through the free space-towards the observer in the form of a light wave front, to reconstruct a three-dimensional scene. Encoding the SLM with the hologram data set causes the wave field emitted from the display to reconstruct the three-dimensional scene as desired by creating interferences in the viewing space.

The present embodiment provides real-time or near real-time control data for each hologram cell for the required wave modulation by computing amplitude and/or phase for a given wavelength.

Annex I: Summary of the Embodiment

The following indices refer to FIGS. 5A-5E.

The object of this embodiment is to provide a method for speeding up computation of computer-generated video holograms, said video holograms allowing simultaneous reconstruction of a three-dimensional scene while maintaining the spatial resolution and reconstruction quality. This embodiment enables interactive real-time or near real-time reconstructions of given video holograms and transfer means. Another object is to provide a method that allows large computer generated holographic reconstructions to be generated; these can be as large as, and also larger than, the hologram itself.

This object is achieved by a method for computing a computer-generated video hologram, where object data defining objects in a three dimensional scene is arranged into a number of virtual section layers, each layer defining a two-dimensional object data set, such that a video hologram data set can be calculated from some or all of these two-dimensional object data sets; comprising the following steps:

(a) in a first transformation, each two-dimensional object data set of the virtual section layers is transformed to a two-dimensional wave field distribution, and the wave field distribution is calculated for a virtual observer window in a reference layer at a finite distance from the video hologram layer, (b) the calculated two-dimensional wave field distributions for the virtual observer window, for all two-dimensional object data sets of section layers, are added to define an aggregated observer window data set;

(c) in a second transformation, the aggregated observer window data set is transformed from the reference layer to the video hologram layer, to generate the video hologram data set for the computer-generated video hologram.

The object data defining a three dimensional scene can be data defining a two dimensional scene, but including additional depth information for converting two dimensional image or video data to three dimensional data. The term 'three dimensional' includes within its scope 'two dimensional'. The depth information may be the same for all object data sets. Hence, the device that generates the hologram can switch from a three dimensional mode to a two dimensional mode, depending on the inputs and also what the user wishes to display.

The term 'layers' should be expansively construed to cover any kind of virtual definable structure that can describe the points that constitute the scene that is reconstructed. It therefore includes any set of virtual parallel surfaces, and any algorithm that can spatially define these points. However, virtual planar sections are computationally the most efficient form of layer to handle.

The term 'plane' should be expansively construed to include a non-planar surface. The reference plane may co-incide with the Fourier plane of the hologram (which is the same as the image plane of the illuminating light source); however, there is a degree of tolerance and an observer's eyes placed sufficiently close to the Fourier plane will see a properly reconstructed scene. The degree of tolerance increases as the pixel count increases.

In one implementation, the first transformation is a Fresnel transform and the second transformation is a Fourier transform. The term 'transformation' should be expansively construed to include any mathematical or computational technique that is equivalent or approximates to a transformation. Transformations used in the normal, mathematical sense are merely approximations to physical processes more accurately described by Maxwellian wave propagation equations; transforms such as Fresnel transforms (or the special class of Fresnel transforms known as Fourier transforms) are second order approximations, but have considerable advantage: because they are algebraic as opposed to differential, they can be handled in a computationally efficient manner.

In order to compensate for errors of the reconstructed aggregate field in the observer window, an iteration process may take place between the distribution in the observer window and the hologram layer.

In order to reduce speckle noise, and enhance brightness or diffraction efficiency and brightness definition in the reference layer of the scene, the object data sets may exhibit an appropriate phase distribution, e.g. a pseudo-random phase distribution.

In contrast to prior art solutions, by performing the first two of the above steps according to this embodiment the hologram of a single aggregated wave field is calculated using a diffraction formulae. Because of the superposition of all individual wave fields, this aggregated wave field contains the entire optical information about the three-dimensional scene within the achieved accuracy.

In a preferred embodiment of this embodiment all object data sets for the section layers are assigned the same total number of discrete matrix points. If the number of matrix points is identical to the number of scanning points in the hologram, fast algorithms can preferably be used for the entire computing process, and processing steps to adapt the resolution to the respective layer, such as interpolation or over sampling, become superfluous. The number of matrix points for all layers results from the number of encoded pixels of the SLM in the hologram display.

A major advantage of the embodiment in combination with the video hologram display known from WO 2004/044659 is that before transforming the reference data set for the aggregated wave field in the hologram layer, the area of the observer window(s) in the reference layer can be restricted so that it is considerably smaller than the area of the SLM light modulator matrix. The extent of the observer window maximally corresponds with the periodicity interval in the layer which contains the image of the light source used for reconstruction, when reconstructing the hologram in the reference layer. This leads to the effect that the computer-generated video hologram according to this embodiment only needs to realize lower diffraction angles compared with other solutions, all the more if the data sets for the reference layer and for the hologram layer have the same number of matrix point values. Thanks to the computation of amplitude values for the light modulator matrix, the demands on processing speed are greatly reduced. In particular, in conjunction with a known position detection and tracking device for tracking the current viewer position, the dimension of the observer window can be greatly minimized to benefit from this advantage. Further, WO 2004/044659, as noted earlier, requires computationally intensive operations performed on every single point in the scene to be reconstructed. With the present embodiment, it is no longer necessary to perform a computationally intensive operation on every single object point; instead, the first transformation (from each section layer to the virtual observer window in the reference plane—where the observer's eyes will be) is performed on entire section layers, rather than each individual object points in a layer. The second transformation going back from the virtual observer window to the hologram layer is even more efficient since it is just a single operation, yet encodes information for all object points.

In a further embodiment of this embodiment, each object data set of the section layers is based on a virtual area size which depends on its distance to the reference layer. The section layer areas result from imaginary faces running from the edges of the respective observer window to the edges of the SLM of the video hologram. Because of the same number of matrix point values in each data set, the area assigned to the individual matrix points changes in proportion to the distance to the reference layer. Assigning the original object data to the object data sets of the section layers that is also known as slicing, leads to assigning the discrete object point values of the scene to a respective matrix point of a two-dimensional coordinate system that describes the matrix points on the respective section layer. According to the local position of the object points with respect to the section layers, the original object information is thereby assigned to the matrix points of the coordinate system which is closest to their spatial position. The distance-dependent areas of the section layers thus lead to the effect that the area-dependent object point resolution to describe a section layer of a scene is larger the closer the section layer is situated to the reference layer. This means that while the foreground of a scene is reconstructed in detail, the same scene element in the background would be reconstructed at a much lower resolution. However, the more distant virtual section layers can reconstruct a much larger viewing area for the background of the scene. This kind of reconstruction of a scene provides a very natural representation of foreground and background elements of a scene on the one hand and helps minimizing the required computing power on the other.

In a preferred embodiment of this embodiment, the value for the distance of each object data set of the virtual section layers can be chosen or changed before transformation so that the entire reconstruction or parts of it appear in front of or behind the hologram layer. This way, both a natural position of the reconstruction in the depth of the space in front of the viewer's eyes and a deliberate amplification or reduction of the depth effect of a synthetic video hologram can be realized through software settings alone.

When encoding according to the prior art method known from WO 2004/044659, the reconstructed three-dimensional scene appears in the free space in front of the viewer's eyes in the form of a wave field controlled by the light modulator matrix. The imaginary section layers used for computing also define the position of the reconstruction in the space in front of the observer windows and are situated at a finite distance to the reference layer. According to the conditions prevailing in an optical near field, this causes the light contribution of each light point, of the holographically reconstructed scene to the aggregated wave field, to propagate as a spherical wave to provide a contribution to the target wave front in the observer window in the reference layer. The transformation of each object data set in the reference layer can thus be expressed with adequate approximation by a Fresnel transform. For this, the amplitude values of all object points of all object data sets are multiplied with a Fresnel phase factor, which depends on the distance of the respective section layer to the reference layer.

The Fresnel phase factor has an exponent which depends on the squared difference of the coordinates between each original section layer and reference layer and other factors. Much processing time and computing power are thus required to perform the many Fresnel transformations. According to a preferred embodiment of this embodiment, this disadvantage is compensated by dividing the difficult Fresnel transformations into individual steps so that these steps can be performed with the help of fast Fourier transformations (FFT) in conjunction with further processing steps in the form of multiplications with spherical wave factors. This method has the advantage that dedicated electronic hardware such as graphics and/or holography adapters can be used for computing video holograms. Such hardware includes at least one dedicated graphics processor with known modules for slicing and other video processing steps, such as image rendering, and at least one specific processor module for performing the Fresnel transformations with the help of fast Fourier transformation routines. Such processors in the form of digital signal processors (DSP) with the required FFT routines can be made inexpensively using known methods. Recent advantages in common graphics processors enable operations such as Fourier transforming the data of the section layers into the reference layer using so called shading algorithms.

In order to simplify the computation of the wave fields, the transformation which describes the propagation of light between the original section layer and the reference layer is modified such that it comprises a Fast Fourier Transformation (FFT) and two multiplications with phase factors describing spherical waves. The first phase factor depends on the coordinates in the original section layer and on the distance between original section layer and reference layer. The second phase factor depends on the coordinates in the reference layer and on the distance between the original section layer and the reference layer. Depending on the collimation of light in the optical system one or both of these phase factors may be set to a constant value.

Thus, the procedure of transforming the distribution of the section layer into the reference layer can be broken into three steps:

1. The amplitude of each object point is multiplied by the first phase factor.
2. The thus generated products are used for a first Fast Fourier Transformation in order to transform the complex light amplitude of each object point from the original section layer to the reference layer.
3. The thus generated transform is multiplied with the second phase factor.

The transform of the reference data set into the hologram layer, in order to generate a hologram data set for the aggregated video hologram of the scene, can also be expressed by a transformation describing the light wave propagation by a Fresnel transform. In order to be able to perform this step, the transformation is carried out according to the steps described above, but before this transformation, the reference data for all section layers in the reference layer are superimposed by way of a complex addition. Also for this Fresnel transform one or both of the phase factors may be set to a constant value, depending on the collimation of light in the optical system.

A particular advantage of this embodiment is that a reference data set for an aggregated wave field is generated by adding the computed reference data sets of all section layers. After the transformation in the hologram layer, this aggregated wave field serves as a basis for the video hologram as it contains the entire three-dimensional scene information. This allows simultaneous reconstruction of the two-dimensional images of all section layers and thus the entire 3D scene.

Another advantage arises when one wants to reduce common errors in the video hologram caused by the encoding process or by technological limits. For reducing the reconstruction errors of the video hologram an iteration process may be used. In the prior art, the object data of a reconstructed three-dimensional scene has to be compared with the original three-dimensional object scene. A complicated iteration process comprising many transformations between the reconstructed three-dimensional object scene and the hologram layer takes place until a desired reconstruction quality is reached. Our approach advantageously allows a much simpler iteration process. As the reference data set contains the entire object information, the iteration process comprises transformations between the hologram layer and the reference layer which is only two-dimensional.

High-quality reconstructions with today's image rendering technologies are just not possible without such correction processes.

The video holograms are preferably computed with the help of a digital signal processing device with slicer means, which assigns the object information, including discrete object values for spatial distribution of the light amplitudes of a real or virtual three-dimensional scene, with matrix points of parallel virtual section layers, so that for each section layer, a separate object data set with object points in discrete matrix points of the tomographic scene section layer is defined. A hologram data set of a video hologram is computed from these object data sets. According to this embodiment the signal processing device further comprises:

First transformation means for computing from each object data set a separate two-dimensional distribution of a wave field for the reference layer situated at a finite distance, and buffer memory means for layer-wise buffering the transformed object data sets, Adding means for adding the transformed object data sets to generate an expression of an aggregated wave field in a reference data set, and Second transformation means for transforming the reference (aggregated) data set in a hologram layer situated at a finite distance and parallel to the reference layer, to generate the hologram data set for an aggregated video hologram of the scene.

The digital signal processing device comprises at least one independently acting transformation means for performing the Fresnel transformations, said transformation means containing:

First multiplication means for multiplying the amplitude value of matrix point values of an original data set with a first phase factor describing spherical waves, the exponent of said factor depending on the squared coordinates in the respective original layer ($L_m$ or RL) and the distance ($D_m$) to a target layer (RL or HL), Fast Fourier transformation means for transforming the products of the first multiplication means from their original sectional layer to the target layer, and Second multiplication means for multiplying that transform with another phase factor describing spherical waves, the exponent of said factor depending on the squared coordinates in the target layer and the distance between target layer and original layer.

As mentioned before, depending on the collimation of light in the optical system one or both of these phase factors may be set to a constant value.

The digital signal processing device can be a multi-processor which has several independently working sub-processors which simultaneously execute transformation routines (TR1, TR2). In order to be able to simultaneously execute at least a certain number of transformations, a resource manager is required which dynamically assigns the transformations required for computation to the available transformation routines depending on the content of the three-dimensional scene. The data sets transformed in the reference layer are buffered in buffer memory means.

This way, depending on the scene content, the data sets can be activated at various points of time and even used several times if no changes occur during scene motion in certain section layers.

For the execution of the Fast Fourier transformation, the object data sets of the virtual section layers are assigned a number N of discrete object point values, said number N being an nth power of 2.

Annex I: Brief Description of the Drawings

The functional principle according to the embodiment is described below in detail with the help of a preferred embodiment and accompanying drawings.

Figure 5A:
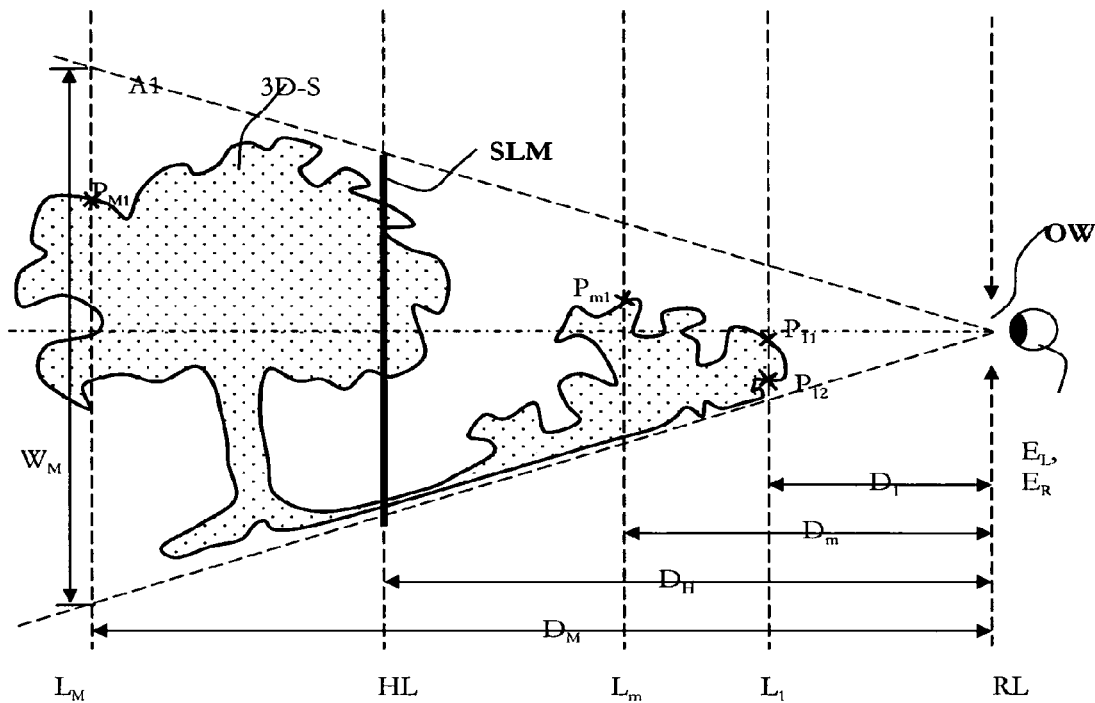
FIG. 5A is a general illustration of a video hologram and a device for reconstructing video holograms showing the generation of the diffraction orders and the position of a viewing window.

FIG. 5A shows (not to scale) the arrangement for reconstructing the three-dimensional scene and the reference layers required for the computation of video holograms.

Figure 5B:
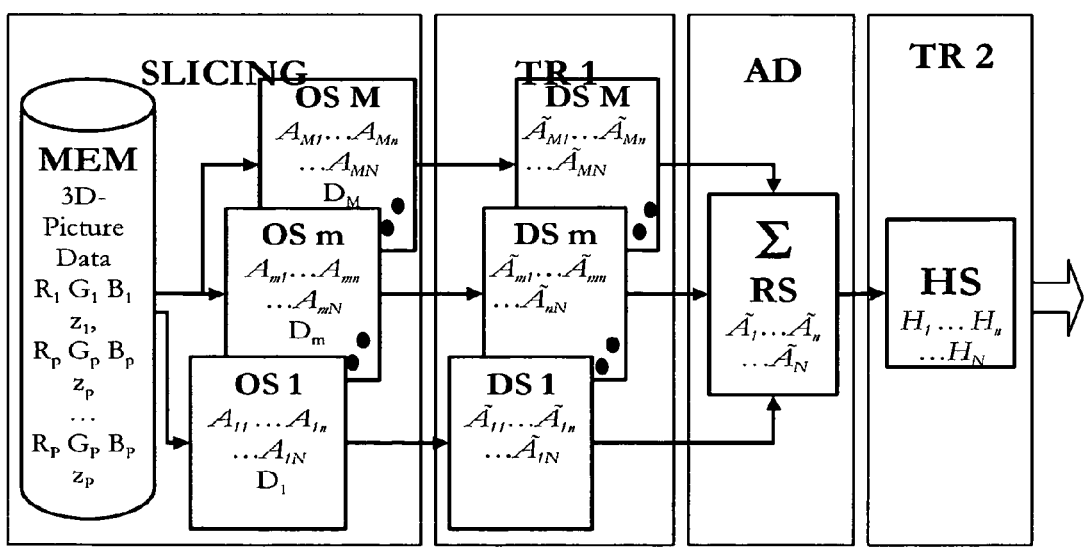
FIG. 5B is a general illustration of a device for reconstructing video holograms showing a three-dimensional scene which can be viewed through a viewing window.

FIG. 5B is a schematic diagram showing the signal processing device for computing video holograms according to this embodiment.

Figure 5C:
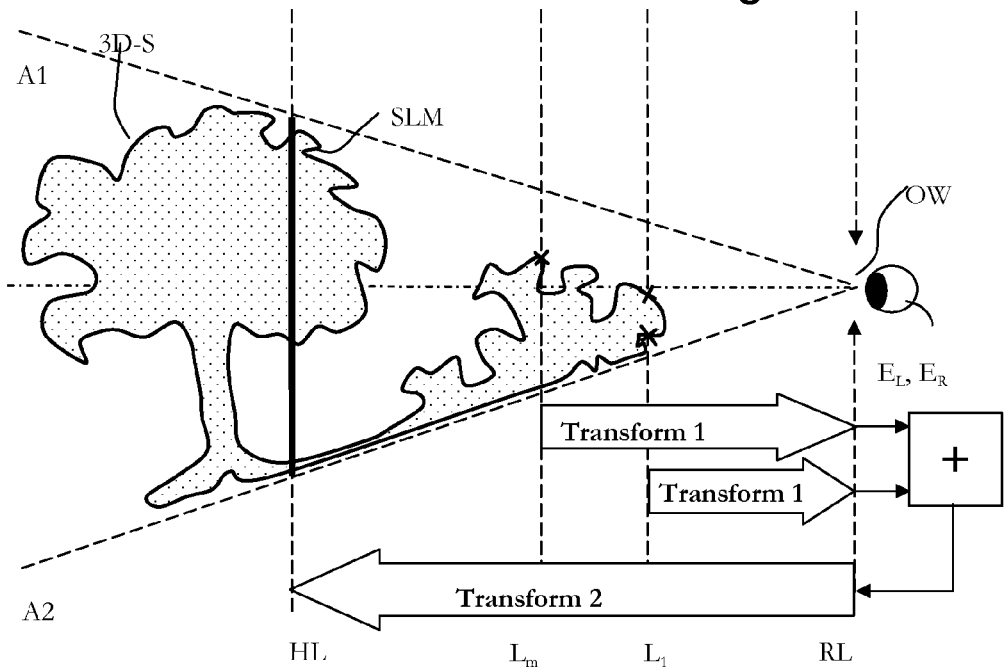
FIG. 5C is a general illustration of a device for reconstructing video holograms showing the encoding of the three-dimensional scene in a part of the video hologram.

FIG. 5C is similar to FIG. 5A and illustrates the main steps of the computation according to this embodiment.

Figure 5D:
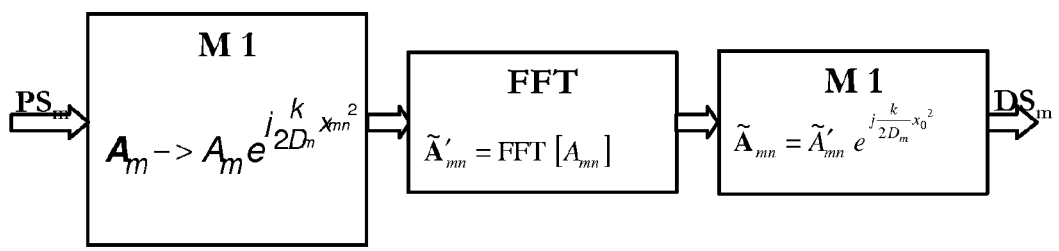
FIG. 5D is a diagram showing the light intensity distribution in the viewing plane depending on the diffraction orders.

FIG. 5D illustrates the functional principle of the transformation means.

Figure 5E:
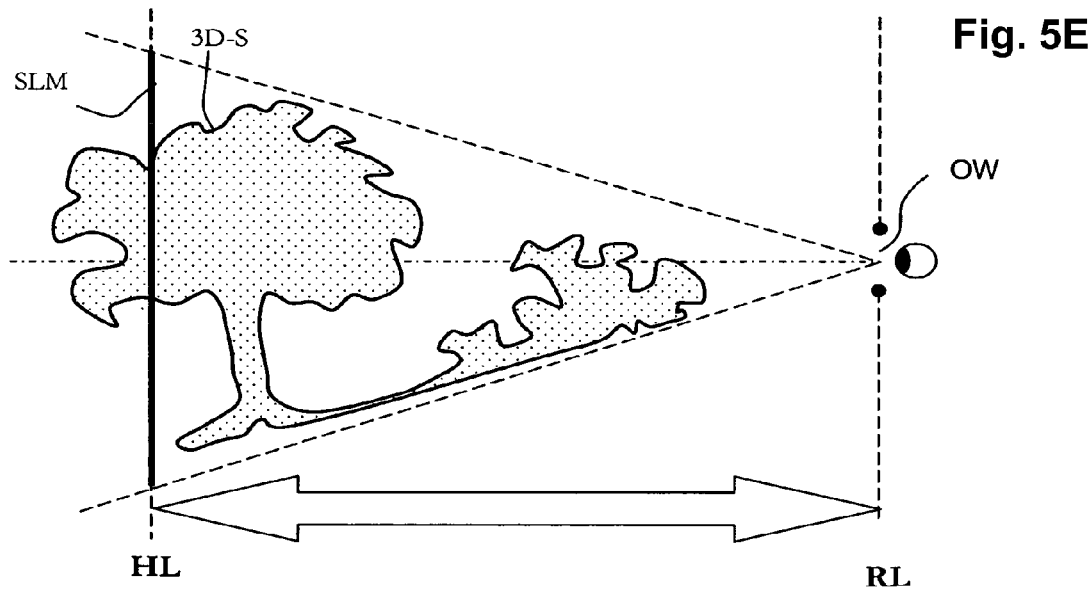
FIG. 5E is a general illustration of a device for reconstructing video holograms showing the position of the viewing windows for both eyes of a viewer with regard to the diffraction orders to prevent cross-talking.
Figure 5E:
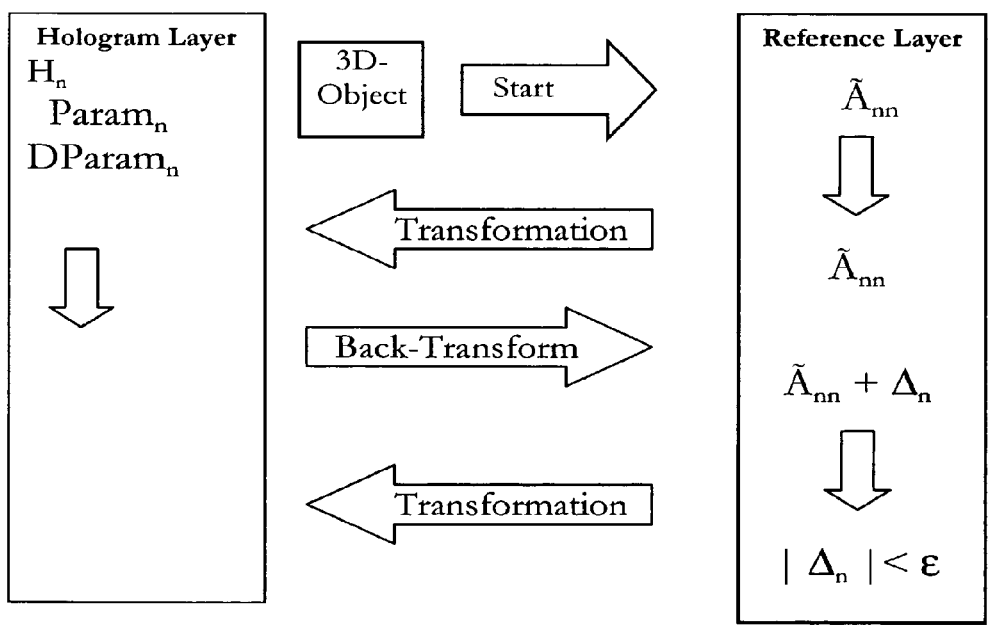

FIG. 5E illustrates the sub-steps executed to correct the matrix point values of the computer-generated hologram.

Annex I: Detailed Description of the Embodiment

The following indices refer to FIGS. 5A to 5E.

The computation of video holograms with a hologram processor is based on original object information of a real or virtual three-dimensional scene, including values for spatial distribution of the light amplitudes in an RGB or RGB-compatible format. These values are available in a known file format and can be called up from a data memory by a hologram processor. This object information contains for example, in the case of an object point file format BMP for each discrete object point of the three-dimensional scene, a set of complex colour object point data $R_o$, $G_o$, $B_o$ for the respective two-dimensional coordinates. The data memory MEM also provides depth information $z_o$ of the three-dimensional scene. It is irrelevant for the depth information $z_o$ for each point whether it is already provided in the first video image file or whether it is computed by the processor from at least one second file containing additional information.

To facilitate understanding of the complex processes, one of the three spatial coordinates (here, the y coordinate) will be neglected in the following description. The assignment of object points of the scene to matrix points $P_{11} \ldots P_{MN}$ in M section layers $L_1 \ldots L_M$ produces object data sets $OS_1 \ldots OS_M$ with N matrix point values. All data sets contain the same number N of matrix point values. This number N is determined by the number of pixels N1 of the light modulator matrix which can represent N1 complex values. If a Fast-Fourier Transform algorithm is used for calculation of the Fourier transform, N has to be reduced to a power of 2, i.e. $N=2^n$ with n being an integer number and $N \leq N1$. E.g. for a display with N1=1280 pixels each data set contains N=1024 matrix point values. However, other Fourier Transform algorithms may be used which do not require $2^n$ input values and hence the whole display resolution N1 could be used.

Seen in conjunction with FIG. 5B, FIG. 5A shows a preferred embodiment and illustrates how the scene is divided into a number M of virtual section layers $L_1 \ldots L_M$ for computation by a slicer shown in FIG. 5B. The slicer analyses in a known manner the depth information z of the original object information stored in the data memory MEM, assigns each object point of the scene with a matrix point $P_{mn}$, and enters according matrix point values in an object data set $OS_m$ corresponding with the section layer $L_m$. For the indices, $0 \leq m \leq M$, and $1 \leq n \leq N$, where N is the number of matrix points P in each layer and the number of matrix point values in a data set. On the one hand, the section layers $L_1 \ldots L_M$ are defined arbitrarily to determine discrete object data sets of the scene, irrespective of whether or not the scene exists in reality. On the other hand, the same section layers $L_1 \ldots L_M$ aim to define the spatial position of the reconstructed scene 3D-S with respect to the video hologram. FIGS. 5A and 5B therefore show the desired reconstruction 3D-S of the scene as defined locally with respect to the video hologram. Further definitions are necessary to be able to perform the computations: each section layer $L_m$ is situated at a distance $D_m$ to a reference layer RL which has a observer window OW near which there are the viewer's eye(s) $E_L/E_R$. The video hologram is disposed in a hologram layer HL which is situated at a distance $D_H$ to the reference layer.

As shown in FIG. 5B, the computation of the hologram matrix is continued by performing the following steps:

Transformation of the object data sets $OS_1 \ldots OS_M$ of the section layers L1 . . . LM in the reference layer RL so to determine the wave field which would generate the complex amplitudes $A_{11} \ldots A_{MN}$ of the object points of each section layer Lm as a contribution to the aggregated wave field in the reference layer RL, if the scene was existent there.

Addition of the transformed object data sets $DS_1 \ldots DS_M$ with the components $\tilde{A}_n$ to form a reference data set RS that defines an aggregated wave field which is to appear in the observer window OW when the scene is reconstructed.

Back-transformation of the reference data set RS from the reference layer RL to form a hologram data set HS in the hologram layer HL situated at a distance of $D_H$ to get matrix point values $H_1 \ldots H_n \ldots H_N$ for encoding the video hologram.

The N pixel values for the video hologram are derived from the typically complex values of the hologram data set. In the video hologram, these values represent amplitude values and wave phases for modulating the light during scene reconstruction.

It has been described above how 3D-S is reconstructed for the viewer in a observer window OW. In order to be able to perceive three-dimensional scenes in a true three-dimensional manner, as if the object was viewed in reality, different holograms are needed in the respective observer windows for each eye.

The hologram matrix for the second observer window is computed in the same way, but with accordingly altered matrix point values. The alterations result from the different positions of both viewer's eyes with respect to the scene 3D-S. The two hologram matrices can be computed at the same time and absolutely independently of each other in accordingly equipped multi-channel digital signal processors with simultaneously working FFT routines. In order to reduce the required computing power, computation results of object data sets which show only little or no difference in content may be jointly used. This may apply to section layers which show a picture background. Both eyes will then see the same scene, but from slightly offset directions.

According to a particular feature of this embodiment, the digital signal processing device contains an object data set manager which compares the contents of corresponding object data sets to alternately assign only one of the two identical object data sets to one of the two signal processor channels for transformation and thus avoid superfluous processing.

In contrast to known solutions, the reconstructions are viewed through the virtual observer windows in frustum-shaped spaces which are defined by imaginary connection faces A1 and A2 stretching from the observer windows OW to the light modulator matrix LM. The 3D-S reconstructions may appear in front of, on or behind the video hologram layer HL or intersect this layer.

The observer window size is sufficient if it covers the lateral size of an eye, in special cases even it may be reduced to pupil size. Assuming a observer window of 1×1 cm$^2$ disposed at a distance of 1 m to the hologram layer, the number of pixels required for the computer-generated video hologram is reduced by a factor of 2,500 ... 10,000 compared with a light modulator matrix with classic encoding methods.

FIG. 5C shows the position of selected layers for the execution of the transformations required for the computation. Only the first virtual section layer $L_1$ and one further layer $L_m$ are shown. However, the contribution of all wave fields is always required to compute the wave field of the section layers $L_1 \ldots L_m$ in the reference layer RL. In order to save computing power, when processing moving three-dimensional scenes, individual transformed data sets $DS_1 \ldots DS_M$ can be buffered and re-used for several subsequent video holograms until there occurs a change in content.

FIG. 5D shows in detail how the amplitude values $A_{m1} \ldots A_{mn} \ldots A_{mN}$ of an object data set $OS_m$ of a section layer $L_m$ at a distance of $D_m$ to the reference layer RL are transformed. To facilitate understanding of this complex process, only a one-dimensional transformation is shown. Equation (1) shows the core of a Fresnel transformation.

$$e^{j\frac{k}{2D_m}(xm-xo)^2} = e^{j\frac{k}{2D_m}x_m^2} * e^{-j\frac{k}{D_m}x_m x_0} * e^{j\frac{k}{2D_m}x_0^2} \tag{1}$$

where the term $$e^{-j\frac{k}{D_m}x_m x_0}$$

denotes the core of a Fourier transformation from a layer with the coordinates $x_m$ in a layer with the coordinates $x_0$, i.e. from a section layer situated at a distance of $D_m$ in a reference layer.

As mentioned before, depending on the collimation of light in the optical system one or both of these quadratic phase factors may be 1.

The equation (2)

$$A_{mn} \to A_{mn} * F1_{mn} = A_{mn} e^{j\frac{k}{2D_m}x_{mn}^2} \tag{2}$$

defines the amplitude $A_{mn}$ of a matrix point value multiplied with the corresponding phase factor $F1_{mn}$ in the layer $L_m$.

Finally, equation (3) shows the result of the Fourier transform of (2) and the multiplication with a phase factor which solely depends on the coordinates $x_0$ of the observer window OW in the reference layer and the distance of the respective section layer to the reference layer. It defines the complex amplitude in a matrix point of the observer window in the reference layer.

$$\tilde{A}_{mn} = \hat{A}'_{mn} e^{j\frac{k}{2D_m}x_0^2} \tag{3}$$

The described solution allows accelerating the computing process so that a dedicated digital signal processor circuit can perform the computation of a sequence of video holograms of a moving scene for both eyes in the form of a real-time non-flickering reconstruction. In order to compensate for errors of the reconstructed aggregate field in the observer window OW, in a preferred embodiment of the embodiment an iteration process shown in FIG. 5E can applied for the calculation between the distribution in the observer window OW and the hologram layer HL.

Annex I: Characteristics of this Embodiment

The following indices refer to FIGS. 5A to 5E.

1. Method for computing a computer-generated video hologram, where object data defining objects in a three dimensional scene is arranged into a number of virtual section layers ($L_1 \ldots L_M$), each layer defining a two-dimensional object data set ($OS_m$), such that a video hologram data set (HS) can be calculated from some or all of these two-dimensional object data sets ($OS_1 \ldots OS_M$); comprising the following steps:

(a) in a first transformation (TR 1), each two-dimensional object data set (OS n) of the virtual section layers is transformed to a two-dimensional wave field distribution, and the wave field distribution is calculated for a virtual observer window (OW) in a reference layer (RL) at a finite distance ($D_M$) from the video hologram layer (HL), (b) the calculated two-dimensional wave field distributions ($DS_1 \ldots DS_M$) for the virtual observer window (OW), for all two-dimensional object data sets of section layers ($L_1 \ldots L_M$), are added to define an aggregated observer window data set (RS);

(c) in a second transformation (TR 2), the aggregated observer window data set (RS) is transformed from the reference layer to the video hologram layer (HL), to generate the video hologram data set (HS) for the computer-generated video hologram.

2. Method according to characteristics 1, where the data of the video hologram data set (HS) is assigned to equally spaced points in the video hologram and these points are organized as a matrix.

3. Method according to characteristics 1, where the section layers ($L_1 \ldots L_M$), the hologram layer (HL), the reference layer (RL) and the virtual observer window (OW) are planar.

4. Method according to any preceding characteristics, where the video hologram layer (HL), the section layers and the virtual observer window are parallel to each other.
5. Method according to any preceding characteristics, where at least one eye of an observer is located near the virtual observer window, so that a reconstructed scene can be seen through the virtual observer window (OW).
6. Method according to any preceding characteristics, in which there are two or more virtual observer windows (OW).
7. Method according to characteristics 1, where the object data ($R_1$, $G_1$, $B_1$, $z_1$ ... $R_P$, $B_P$, $B_P$, $z_P$) are assigned to object data sets ($OS_1$ ... $OS_M$), all of which comprise the same number (N) and matrix structure of values as the aggregated observer window data set (RS) and the hologram data set (HS), where the number and structure of values for all data sets ($OS_1$ ... $OS_M$, RS, HS) is derived from the number of pixels used for encoding the video hologram.
8. Method according to characteristics 2, where the two-dimensional object data sets ($OS_1$ ... $OS_M$) and the aggregated observer window data set (RS) have the same matrix structure as the video hologram data set (HS).
9. Method according to any preceding characteristics where the virtual observer window (OW) in the reference layer is set to be smaller than or equal to the size of a periodicity interval in the reference layer and located completely within one periodicity interval.
10. Method according to any preceding characteristics in which the reference layer co-incides with the Fourier plane of the hologram.
11. Method according to characteristics 1, where each object data set ($OS_m$) is based on the area of the corresponding section layer ($L_m$), which depends on its distance ($D_m$) to the reference layer (RL).
12. Method according to characteristics 11, where the area of each section layer is defined by intersections with imaginary faces (A1, A2) which connect the edges of the virtual observer window (OW) and the edges of the video hologram.
13. Method according to characteristics 1, where the sections layers ($L_m$) have distance (D1 ... $D_m$) to the virtual reference layer (RL) are set such that the entire reconstructed scene (3D-S) or parts of it appear in front of and/or behind the hologram layer (HL).
14. Method according to characteristics 1, where the first transformation is a Fresnel transformation which comprises the following sub-steps:
Multiplication of the amplitude value $A_{mn}$ of each object point of an original section layer ($L_m$) with a first phase factor describing spherical waves ($F1_{mn}$), the exponent of said factor depending on the squared coordinates ($x_m$, $y_m$) in the original section layer ($L_m$) and the distance ($D_m$) between the original section layer ($L_m$) and a reference layer (RL),
Transformation of the thus calculated products for each object point ($A_{m1}$ ... $A_{mN}$) of the original section layer ($L_m$) with the help of a first fast Fourier transformation (FFT) from the original section layer ($L_m$) to the reference layer (RL),
Multiplication of the thus calculated transforms ($Ã'_{m1}$ ... $Ã'_{mN}$) with a second phase factor describing spherical waves ($F2_{mn}$), the exponent of said factor depending on the squared coordinates (x, y) in the reference layer (RL) and the distance ($D_m$) to the original section layer ($L_m$).

15. Method according to characteristics 1, where the second transformation is also a Fresnel transformation which comprises the following sub-steps:
Multiplication of each complex amplitude value ($Ã_n$) of the reference data set (RS) with a third phase factor describing spherical waves ($F3_n$), the exponent of said factor depending on the squared coordinates ($x_0$, $y_0$) in the reference layer (RL) and the distance ($D_m$) between the reference layer (RL) and the hologram layer (HL),
Transformation of the thus calculated products of the complex amplitude values ($Ã_1$ ... $Ã_N$) with the help of a second fast Fourier transformation (FFT) from the reference layer (RL) to the hologram layer (HL),
Multiplication of the thus calculated transforms ($H'_1$ ... $H'_N$) with a fourth phase factor describing spherical waves ($F4_n$), the exponent of said factor depending on the squared coordinates (x, y) in the hologram layer (HL) and the distance ($D_H$) between the hologram layer (HL) and the reference layer (RL), so to get the desired hologram values ($H_1$ ... $H_N$) for the hologram data set (HS) used for encoding.
16. Method according to characteristics 14 or characteristics 15 where one or both of the phase factors describing spherical waves ($F1_{mn}$, $F2_{mn}$) may be set to a constant value.
17. Method according to characteristics 1, where the first and/or second transformation is a Fourier transformation.
18. Method according to characteristics 1, which comprises the following sub-steps for correcting point values of the computer-generated video hologram by way of iteration:
A) the observer window data set (RS) from an original three-dimensional scene is defined as a target function for the first transformation,
B) back-transformation of the original complex amplitude values ($Ã_1$ ... $Ã_N$) of the target function to the hologram layer (HL) to get matrix point values ($H_1$ ... $H_N$) of the hologram data set (HS),
C) derivation of parameters (Paramn) of the hologram data set (HS) for a light modulator matrix (LM),
D) transformation of the Derivation of parameters (Paramn) to the reference layer (RL) to get a distribution of complex up-dated amplitude values ($Ã_1'$ ... $Ã_N'$) in the virtual observer window (OW),
E) forming a difference (Δ) of the distribution of complex up-dated amplitude values ($Ã_1'$ ... $Ã_N'$) and original values ($Ã_1$ ... $Ã_N$) of the target function,
F) back-transformation of this difference (Δ) to a distribution of difference point values ($ΔH_1$ ... $ΔH_N$) in the hologram layer (HL),
G) subtraction of the distribution (ΔH) from the video hologram data set (HS) and updating the hologram data set,
H) repeating of the steps C) to G)
I) termination of the iteration when the approximation accuracy has been reached.
19. The method of any preceding Characteristics in which depth information is the same for all object data sets.
20. The method of Characteristics 19 in which a device that generates the hologram can switch from a three dimensional mode to a two dimensional mode, depending on the inputs and/or what mode the user selects.
21. Digital signal processing device for computing computer-generated video holograms with digital slicer means, which assigns object data defining objects in a three dimensional scene to a number of virtual section layers ($L_1$ ... $L_M$), each section layer defining a separate object data set ($OS_n$), such that a video hologram data set (HS) for a video hologram can be calculated from some or all of these object data sets, containing:

(a) first transformation means (TR1) for computing from each object data set ($OS_m$) a separate, two-dimensional wave field distribution for a virtual observer window in a reference layer (RL) situated at a finite distance ($D_M$), and buffer memory means for buffering transformed object data sets, (b) adding means (AD) for adding the transformed object data of all section layers to generate a wave field expression of an aggregated observer window data set (RS), and (c) second transformation means (TR2) for transforming the observer window data set (RS) to a hologram layer (HL) situated at a finite distance and parallel to the reference layer (RL), to generate the hologram data set (HS) for the aggregated video hologram.

22. Device according to characteristics 21, which comprises at least one independently working transformation means (TR1, TR2) for performing transformations, said device containing:

First multiplication means (M1) for multiplying the amplitude value ($A_{mn}/\tilde{A}_n$) of values of an original object data set ($OS_m$) with a first phase factor describing spherical waves ($F1_{mn}/F3_n$), the exponent of said factor depending on the squared coordinates ($x_m$, $y_m$) in the respective original layer ($L_m$ or RL) and the distance ($D_m$) to a target layer (RL or HL), Fast Fourier transformation means (FFT) for transforming the products of the first multiplication means (M1) from their original layer ($L_m$/RL) to the target layer (RL/HL), and Second multiplication means (M2) for multiplying that transform with another phase factor describing spherical waves ($F2_{mn}/F4_n$), the exponent of said factor depending on the squared coordinates in the target layer and the distance between target layer and original layer.

23. Device according to characteristics 22, where for the execution of the fast Fourier transformations all data sets have a number (N) of discrete matrix point values, said number (N) being an nth power of 2.

24. Device according to characteristics 21, which includes a multi-channel digital signal processor (DSP) for independent and simultaneous execution of frequently re-occurring computation routines.

25. Device according to characteristics 21, which includes a multitude of independently working sub-processors which comprise simultaneously executed transformation routines (TR1, TR2), and a resource manager which dynamically assigns the transformations required for computation to the available transformation routines depending on the content of the three-dimensional object, in order to be able to simultaneously execute at least a certain number of transformations.

26. Device according to characteristics 21, which is a multi-channel processor for simultaneous computation of the hologram data sets ($HS_L$, $HS_R$) for both eyes.

27. Device according to characteristics 21, which includes object data set controlling means for comparing the contents of corresponding object data sets ($OS_m$) in hologram computations with different original object data, in order to execute like transformations only once in one of the two signal processor channels and to co-use the transforms in the other channel.

28. Device according to characteristics 21, where one or all of the phase factors describing spherical waves ($F1_{mn}/F3_n$, $F2_{mn}/F4_n$) may be set to a constant value.

29. Device according to Characteristics 21 adapted to switch from a three dimensional mode to a two dimensional mode, depending on the inputs and/or what mode a user selects.

Annex II

Theoretical Background: Detail and Enhancements to the Preferred Embodiments

This section gives further theoretical background to the embodiments mentioned above.

1. Diffraction Orders and Observer Windows

Description of Periodic Repetitions of a Diffraction Pattern.

a) The pixelation of a hologram on an SLM leads to a periodic repetition of the diffraction pattern in the viewing plane. The observer window has to be within one periodicity interval, i.e. the observer window has to be smaller than the periodicity interval. The pixel pitch of the SLM and the encoding method of the complex-valued hologram on the SLM determine the size of the periodicity interval and how much of it can be used as a observer window.

b) The standard LCD panels modulate mostly the amplitude and can be used as amplitude-modulating SLMs for displaying the hologram. One method to encode the complex-valued hologram data on an amplitude-modulating SLM is Burckhardt encoding which is based on the detour-phase effect. A set of three neighbouring pixels is needed to encode one complex value.

For Burckhardt encoding the diffraction orders ($-1^{st}$, $0^{th}$, $1^{st}$, $2^{nd}$, $3^{rd}$, etc. diffraction order) can be classified into three categories:

$0^{th}$, $3^{rd}$, etc. diffraction orders, containing undiffracted light without object reconstruction $1^{st}$, $4^{th}$, etc. diffraction orders, containing the reconstruction of the object $-1^{st}$, $2^{nd}$, etc. diffraction orders, containing the reconstruction of a depth-inverted object The reconstructed object can be seen in the $1^{st}$, $4^{th}$, etc. diffraction orders. Due to the finite aperture of the LCD pixels the intensity of the diffraction pattern falls off towards higher diffraction orders. Therefore it is advantageous to locate the observer window in the $1^{st}$ diffraction order.

Not a single diffraction order is periodically repeated but the set of $1^{st}$, $0^{th}$ and $-1^{st}$ diffraction orders together. Hence, the periodicity interval comprises the $1^{st}$, $0^{th}$ and $-1^{st}$ diffraction orders. Its size is given by $$P_{diffr} = \lambda * d/p$$

d is the distance between hologram and viewing plane, p is the pixel pitch and $\lambda$ is the wavelength.

As the object is reconstructed in the $1^{st}$ diffraction order and not in the $-1^{st}$ or $0^{th}$ diffraction order, the observer window cannot cover the whole periodicity interval but only the $1^{st}$ diffraction order. The size of the $1^{st}$ diffraction order is ⅓ of the periodicity interval $P_{diffr}$.

c) With a complex-modulating SLM each single pixel can be used to encode one complex number. Therefore, each periodicity interval in the viewing plane contains only one diffraction order. Hence, the whole periodicity interval can be used as an observer window.

If a phase-modulating SLM is used in a Fourier hologram the periodicity interval contains no reconstruction of a depth-inverted object. However, there is also undiffracted light. Therefore, not the whole periodicity interval can be used as a observer window, but most of it. The undiffracted light has to be excluded from the observer window.

d) In general we might say that the observer window has to be within one periodicity interval. Each periodicity interval contains not only the reconstructed object but also undiffracted light and in some cases a depth-inverted object. The fraction of the periodicity interval which can be used for the observer window depends on the SLM and the encoding scheme. The size and the position of the observer window within the diffraction order have to be determined appropriately. Care has to be taken that only the reconstructed object can be seen in the observer window and no depth-inverted object or undiffracted light.

e) General quantitative description of observer window size:

In our terminology the periodicity interval comprises not only the diffraction order in which the reconstructed object can be seen, but (depending on the encoding technique) also the diffraction orders containing undiffracted light and depth-inverted object. The extent of the periodicity interval is mainly determined by the pixel pitch, i.e. it is fixed for a given SLM. This means that the observer window can be enlarged by optimizing the encoding technique. If N pixels are needed to encode one complex number the maximum size of the observer window is 1/N of the periodicity interval, e.g.:

Burckhardt encoding on (mostly) amplitude-modulating SLM:
   3 pixels per complex number=>maximum size of observer window=⅓ of periodicity interval Double-phase encoding on (mostly) phase-modulating SLM:
   2 pixels per complex number=>maximum size of observer window=½ of periodicity interval Kinoform encoding on (mostly) phase-modulating SLM:
   1 pixel per complex number=>maximum size of observer window=periodicity interval 2 Size of the Observer Window a) In conventional electro-holographic displays the hologram is calculated as the Fourier Fresnel transform of the objects. This leads to a small object size if low-resolution SLMs are used. In contrast thereto, in our electro-holographic display the hologram is calculated as the Fourier transform of the observer window.

This leads to a small observer window if low-resolution SLMs are used.

The observer window serves only as a window through which the observer can view the reconstructed 3D scene. The small observer window does not matter if it is larger than the eye pupil and if the eye pupil is properly tracked.

b) The occurrence of multiple object reconstructions in a frustrum defined by the SLM and the observer window can be avoided if:

Either the encoded area is appropriately limited. This can be done with a geometrical construction (cf FIG. 2 and Annex III, concept C). The object is sampled in object points. The hologram information of each object point is encoded only in a small encoded area whose size and position can be seen in FIG. 3. The encoded areas or elementary/projection holograms of all object points are superimposed on the hologram.

Equivalent to the superposition of the projection holograms is to slice the object into object planes. The object is limited by the frustrum. Each object plane is propagated with a Fresnel transform to the observer window where all Fresnel transforms are added. The summed Fresnel transforms are then Fourier-transformed to the hologram plane. This method inherently implies that no multiple reconstructions can be seen from the observer window.

c) Based on this method a prototype display was built. Using a commercial 20" monochrome LCD panel with 69 μm pixel resolution a observer window with size 6 mm at a distance of 2 m is possible. This results in an electro-holographic display with 20" screen diagonal.

3 Multiplexing of Several Observer Windows

By reducing the observer window to a size slightly larger than the eye pupil the resolution and (therefore the number of SLM pixels) can be significantly reduced. This implies that for one observer at least two observer windows are necessary. In each observer window a reconstruction of the object in an appropriate perspective can be seen. Either temporal or spatial multiplexing of the observer window can be used.

a) Temporal multiplexing means that the observer windows are generated sequentially. This can be done by synchronous switching of the light sources and the hologram panel (SLM). Thus the viewer's eyes are sequentially illuminated. To avoid flickering the switching rate has to be sufficiently high, i.e. preferably at least 25 Hz. This requires fast LCD panels which are currently hardly available as large monochrome panels.

b) Spatial multiplexing means that all observer windows are displayed at the same time. Care must be taken that the observer windows are spatially separated in the viewing plane so that no overlap or cross-talk occurs. This can be done e.g. by interlacing two or more holograms on the SLM and a beam splitter such as a barrier mask. Also other optical elements for image separation/beam splitting or techniques known from autostereoscopic displays can be used, e.g. prism masks or lenticular masks.

4 Horizontal and/or Vertical Parallax

A full-parallax hologram reconstructs an object holographically by coherent superposition of waves in the horizontal and vertical directions. Given a sufficiently large observer window or observer region the reconstructed object facilitates motion parallax in horizontal and vertical direction, like a real object. However, a large observer region requires high resolution in both horizontal and vertical direction of the SLM.

Often, the requirements on the SLM are lessened by restricting to a horizontal-parallax only (HPO) hologram. The holographic reconstruction takes place only in horizontal direction whereas there is no holographic reconstruction in vertical direction. This results in a reconstructed object with horizontal motion parallax. The perspective view does not change upon vertical motion. A HPO hologram requires less resolution of the SLM in vertical direction than a full-parallax hologram. There is only a periodicity in the reconstruction direction, i.e. horizontally. The computational load is decreased for one-dimensional line holograms.

A vertical-parallax only (VPO) hologram is also possible but uncommon. The holographic reconstruction takes place only in vertical direction. This results in a reconstructed object with vertical motion parallax. Also eye accommodation (adapting the eye lens curvature to the object distance) is accomplished by a VPO hologram as it is with a HPO hologram. There is no motion parallax in the horizontal direction. The different perspective views for left eye and right eye have to be created separately. This can be done by temporal or spatial multiplexing of the observer windows, as described above.

5 Colour Holograms

Colour holograms can either be generated with temporal or spatial multiplexing. For temporal multiplexing R, G and B light sources are switched synchronously with the corresponding hologram contents on the SLM. For spatial multiplexing three R, G and B holograms are displayed on interlaced R, G and B pixels, illuminated by a spatially coherent white light source or separate R, G and B sources.

6 Continuous SLM

A pixelated SLM (e.g. an LCD panel) as hologram-bearing medium leads to periodic repetitions of the reconstructed object and of the observer window. By using the methods described in this specification it can be avoided that multiple reconstructions of the object are seen by the observer. Therefore, our method is preferably applied to pixelated SLMs.

However, our method can also be applied to continuous SLMs, e.g. an optically addressed spatial light modulator (OASLM). An OASLM itself is continuous and would hence not require those aspects of the embodiment that eliminate multiple reconstructions for the observer. However, the OASLM is usually optically addressed with an electrically addressed SLM, which does have a pixel structure. This may result in a residual pixel structure on the OASLM and therefore periodic replications of the object in the observer window may occur. Hence it may be useful to apply our method to an OASLM or other continuous SLMs.

7 Combination of HPO Hologram and Spatial Multiplexing

Spatial multiplexing of horizontally aligned observer windows is preferably used in combination with a VPO-Vertical Parallax Only-hologram. Horizontally aligned observer windows require beam splitting elements which split the beams emanating from the SLM horizontally. A VPO hologram can be illuminated by horizontal line light sources which are spatially incoherent in the horizontal direction. Therefore, in the horizontal direction, the observer window is limited only by the optical elements for beam splitting, which can be treated in the same way as for conventional autostereoscopic displays. The limitation of the observer window due to the periodicity interval and diffraction orders only applies in the vertical direction, where the horizontal line light sources are spatially coherent. In the horizontal direction, there is no mutual interference between diffraction and beam splitting.

In principle, it is also possible to combine a HPO hologram and spatial multiplexing of horizontally aligned observer windows. However, care must be taken because beam splitting and diffraction now both operate in horizontal direction.

8 Coherence of the Light Source

We have to distinguish between temporal and spatial coherence.

a) Spatial coherence is related to the lateral extent of the light source. Light from a laser source can be regarded as emanating from a point source (within diffraction limits and depending on the modal purity) and leads to a sharp reconstruction of the object, i.e. each object point is reconstructed as a point (within diffraction limits). Light from a spatially incoherent source, e.g. a LED or a CCFL, is laterally extended and causes a smearing of the reconstructed object. The amount of smearing is given by the broadened size of an object point reconstructed at a given position. In order to use a spatially incoherent source for hologram construction, a trade-off has to be found between reconstruction quality and brightness by adjusting the aperture width. A smaller aperture results in improved spatial coherence and hence lowers the degree of blurring or smearing. But a smaller aperture results in a lower brightness. The term "partial spatial coherence" is used to describe the sources.

b) Temporal coherence is related to the spectral line width of the light source. The diffraction angle at the SLM is proportional to the wavelength which means that only a monochromatic source will lead to a sharp reconstruction of an object point. A broadened spectrum will lead to broadened object points and smeared object reconstructions. The spectrum of a laser source can be regarded as monochromatic. The spectral line width of a LED is sufficiently narrow (ca. 20 nm FWHM) to facilitate good reconstructions.

9 Point Light Sources and Parallax

For a hologram with full parallax one or several point sources in combination with one single rotationally symmetrical lens or an array of rotationally symmetrical lenses have to be used. Preferably, for a hologram with HPO or VPO one or several line light sources are used in combination with a single cylindrical lens or an array of cylindrical lenses (lenticular). The line light sources and the lenses have to be aligned parallel.

Line light sources have the advantage of higher brightness, lenticulars are easier to manufacture than arrays of rotationally symmetrical lenses.

However, also other combinations are possible for HPO or VPO:
point source(s) and rotationally symmetrical lens/lens array
point source(s) and cylindrical lens/lenticular
line source(s) and rotationally symmetrical lens/lens array

10 Combinations of Light Sources and Lenses

The light sources may be spatially coherent sources (e.g. lasers) or sources with sufficient partial spatial coherence (e.g. LED with sufficiently small aperture).

Different types of light sources arrangements:
one point source
1D array of point sources
2D array of point sources
one line source
array of line sources Preferable orientations of line sources and arrays will be discussed below.

Different types of lens arrangements:
one large rotationally symmetrical lens
1D array of rotationally symmetrical lenses
2D array of rotationally symmetrical lenses
one large cylindrical lens
array of cylindrical lenses (lenticular)

Preferable orientations of cylindrical lenses and lens arrays will be discussed below. For simplification the terms "rotationally symmetrical lens" and "cylindrical lens" may refer to spherical cross sections of the lens and aspherical cross sections. Aspherical cross sections may be used to reduce spherical aberrations. There are preferable combinations of light sources and lenses:

a) One point source and one rotationally symmetrical lens. This combination is the easiest for small displays. It is preferably used for full-parallax holograms. For larger displays, i.e. diagonal larger than several inches, the required high-intensity point source and the large bulky lens make this combination inappropriate.

b) 2D array of point sources and 2D array of rotationally symmetrical lenses. This combination is preferable for large full-parallax holograms. Each point source corresponds to one lens. Each light source has to illuminate only a single lens of the lens array which facilitates to split the required amount of total intensity to many light sources. This lessens the requirements on the intensity of each light source. Also a lens array is much easier to fabricate and less bulky than a single large lens with the same focal length.

c) Array of vertically aligned line sources and array of vertically aligned cylindrical lenses (vertically aligned lenticular). This combination is used for HPO holograms. The vertically aligned cylindrical lenses focus the light in horizontal direction resulting in a HPO hologram. In the vertical direction there is no motion parallax. Each line source corresponds to one lenticule. Compared to a 2D array of point sources and a 2D array of lenses there is the advantage that a lenticular is easier to fabricate than a 2D array of lenses. Also the requirements on the intensity in a line light source are lower than for a point source: the light flux is distributed on a line and not concentrated on a small spot.

d) Array of horizontally aligned lines sources and array of horizontally aligned cylindrical lenses (horizontally aligned lenticular).

This combination is used for VPO holograms. The horizontally aligned cylindrical lenses focus the light in the vertical direction, resulting in a VPO hologram. Without additional means there is no motion parallax in the horizontal direction. Each line source corresponds to one lenticle. This combination of sources and lenticular may be further combined with optical elements for conventional autostereoscopic image separation. The VPO hologram with coherent superposition of waves in the vertical direction is not influenced by the autostereoscopic image separation in the horizontal direction and vice versa. This results in a combination of a holographic and an autostereoscopic display. The holographic reconstruction in vertical direction satisfies eye accommodation. The autostereoscopic image separation together with spatial multiplexing generates different perspective views for left eye and right eye.

11 Types of Light Sources

There are different possibilities to generate the light sources, e.g.:

a) A single point light source may be a laser diode or another type of laser. A LED can be used if the aperture of the diode is sufficiently small to ensure sufficient spatial coherence. An additional aperture may have to added.

b) An array of point sources can be generated by e.g.:
  An array of single point sources, e.g. laser, LED
  A single laser or LED which is coupled into an optical fiber bundle. The outputs of the fiber bundle are appropriately arranged to form the desired source array.
  A large area illumination composed of several lasers, LEDs, CCFLs, etc. The light emanating from these sources is then shaped by an array of apertures. This array of apertures may be static or configurable, e.g. it may be a LCD panel (shutter panel) which is transparent only at the locations of the desired point light sources. The configurable apertures on a LCD panel is preferably used to shift the light sources for observer tracking.

c) An array of line light sources can be generated by e.g.:
  An array of point sources which are aligned in lines, e.g. laser, LED
  An array of point sources which are extended in one direction by 1D diffuser sheets, lenticulars, etc.
  A large area illumination composed of several lasers, LEDs, CCFLs, etc. The light emanating from these sources is then shaped by an array of stripe-like apertures. This array of apertures may be static or configurable, e.g. it may be a LCD panel (shutter panel) which is transparent only at the locations of the desired line light sources. The configurable apertures on a LCD panel is preferably used to shift the light sources for observer tracking.

d) Instead of a large-area illumination and an aperture on a LCD panel to generate a configurable array of point or line sources an OLED panel may be used. An OLED panel is an array of small organic light emitting diodes with a pitch of the order of 100 μm. The desired array of point or line sources can be generated if only the appropriate OLED pixels are switched on.

e) Also other sources may be used to generate single point sources, arrays of point sources and arrays of lines sources, e.g. CCFL, metal vapour lamps (e.g. Hg vapour lamp). An appropriate aperture may have to be applied to ensure sufficient spatial coherence.

f) A single source replicated by an array of lenses or a single hologram exhibiting this feature. The output may be an array of points or lines/columns or an array/line/column of extended light beams with arbitrarily shaped wavefront. For instance, an array of lines can be formed to serve directly as illumination for the hologram.

12 Mutually incoherent Light Sources and Sub-Holograms

The light sources of an array of light sources are usually mutually incoherent. This means that there is no fixed phase relation between them. There will be no coherent superposition of waves emanating from different light sources.

In relation to a hologram which is illuminated by an array of light sources and through an array of lenses, this means that there is no coherent reconstruction across the whole hologram-bearing medium/SLM. Rather, the hologram is split in several sub-holograms belonging to individual light sources and lenses. Each of the sub-holograms is coherently illuminated and reconstructs the sub-object which is encoded on this sub-hologram. As there is no mutual coherence between the sub-holograms, the sub-objects do not superimpose coherently but incoherently. This results in an addition of the intensities instead of the amplitudes and leads to a lower intensity of the reconstructed object. Still, there is a reconstructed object which is composed of several sub-objects.

The effect of mutually incoherent light sources is less than for conventional holograms. The hologram information for an object point is not encoded on the whole hologram but only in a small encoded area. The typical size of an encoded area is several millimeters. This is approximately the same size as the typical pitch of the light sources and hence the typical pitch of the lens array. Therefore an encoded area is illuminated by only few and not by many mutually incoherent light sources.

Composing the hologram of many small encoded areas and splitting the illumination in many mutually incoherent sources also facilitates the use of low-coherence sources like LEDs. Coherence is needed only across an area with extent of several millimeters and not across the whole hologram. Coherent illumination of a 20" hologram would require high-coherence sources like lasers.

13 Focusing of Light Sources in the Observer Plane

A Fourier hologram requires that the light sources are imaged to the observer plane. The imaging is done with a lens or a lens array. Compared to a Fresnel hologram the Fourier hologram has the advantage that undiffracted light is focused to small spots in the observer plane. If these spots are outside the observer window the undiffracted light is not visible as disturbing background.

In the case of a coherent light source the size of the imaged light source is limited by diffraction and aberrations at the lens and is usually very small (compared to the resolution of the human eye). In the case of a spatially incoherent source (e.g. LED) the size of the imaged light source is also determined by the aperture of the light source and magnification of the lens.

If an array of light sources and an array of lenses are used, the images of all light sources have to coincide. This means that the pitch of the light source array has to be slightly larger than the pitch of the lens array, according to a simple geometrical construction. If the sources and lenses are properly aligned a diffraction pattern is visible in the observer plane which looks like the diffraction pattern as if a single source and a single lens was used.

There may be additional optical elements which shape the light distribution in order to homogenize the light distribution or increase the intensity in the observer plane. These may be diffuser sheets or lenses.

14 Tracking

For a pure holographic setup tracking of the observer is achieved by shifting the light source(s) relative to the lens (array). This may be done by mechanically shifting the source(s) or the lens (array) or by electronically shifting the apertures on the shutter LCD panel. Tracking might also be done by a configurable diffractive optical element or a scanning mirror.

If holographic object reconstruction in vertical direction and autostereoscopic image separation in horizontal direction are combined, tracking in horizontal direction can also be done by horizontal shifting of the VPO hologram on the SLM.

15 Types of SLM

The SLM may be a cell based/pixelated or a continuous SLM.

Cell Based
    Liquid crystal (transmissive or reflective)
        amplitude modulating
        phase modulating
        combined amplitude and phase modulating
    MOEMS (Micro Optical Electro Mechanical Micro System)
        piston
        other types of cell based SLM
Continuous
    optically addressed SLM (OASLM)
    Acousto optic modulator (AOM)
    other types of continuous SLM 16 Description of a Characteristic Embodiment In a characteristic embodiment a monochrome LCD panel with 20" diagonal is used as hologram-bearing medium. The pixel pitch is 69 µm in vertical direction and 207 µm in horizontal direction. The LCD modulates the amplitude of the light.

The hologram is illuminated by an array of horizontal line light sources and a lenticular with horizontally aligned lenticles. The array of horizontal line light sources is generated by transparent slits on a LCD shutter panel which is illuminated by an array of red high-power LEDs.

The horizontal line light sources are vertically spatially coherent. Together with the horizontally aligned lenticles they facilitate the reconstruction of Fourier holograms with VPO. As the hologram-bearing LCD is amplitude-modulating, Burckhardt encoding is used. This means that three pixels are needed to encode one complex number. The corresponding pitch is therefore 3*69 µm=207 µm which leads to a size of the observer window of 6 mm at a distance of 2 m. The periodicity interval of the set of observer window, undiffracted light and depth-inverted image ($1^{st}$, $0^{th}$ and $-1^{st}$ order) is determined by the pixel pitch of 69 µm and is 18 mm at a distance of 2 m. The observer window is only slightly larger than the eye pupil and therefore requires careful tracking of the eye pupils. This is achieved by an eye finder which detects the position of the eyes. These data are used to control the vertical position and the pitch of the line light sources on the LCD shutter panel.

With the techniques described up to now each eye would see a hologram, however with the same perspective view, as the hologram is VPO. Therefore an autostereoscopic image separation is added. A vertically aligned lenticular is placed between the hologram-bearing LCD and the observer. Two holograms (one with left-eye and the other with right-eye perspective view) are interlaced on the hologram-bearing LCD, e.g. the left-eye perspective view on the even columns and the right-eye perspective view on the odd columns. Thus the left eye only sees the reconstruction containing the left-eye perspective view and the right eye the reconstruction containing the right-eye perspective view. The observer is horizontally tracked by horizontally shifting the hologram content on the hologram-bearing LCD.

Thus all necessary information for 3D viewing is provided. The VPO hologram leads to eye accommodation and the autostereoscopic image separation provides the parallax information. Instead of spatial multiplexing also temporal multiplexing is possible. However, this requires sufficiently fast displays which are not yet available in the desired size and resolution.

Annex III

The following Annex III summarises key concepts from and enhancements to WO 2004/044659, the contents of which are incorporated by reference.

Interpretational Points:

The term computer or computing device means any device or component capable of computations; it covers ASICs, main CPUs, DSPs, etc.

A light source means any source of illumination, hence includes an array of separate light sources.

Concept A. Observer Window at the Image Plane

A display device for video holography, in which the device enables a holographic reconstruction of an object to be viewed; the device including a light source and an optical system to illuminate a hologram-bearing medium;
    wherein the device is operable such that when an observer's eyes are placed approximately at the image plane of the light source, the reconstruction can be seen.

Additional Features:

The reconstruction is the Fresnel transform of the hologram.

The device is operable such that a direct or inverse Fourier transform of the hologram is generated at a viewing plane at which the observer's eyes must be placed.

The holographic reconstruction can occur anywhere within a volume defined by the hologram and a virtual observer window formed on the image plane, through which the observer can view the reconstruction.

There are separate observer windows, one for each eye.

An observer window is approximately 1 cm×1 cm.

The location of an observer's eyes are tracked and the device can alter the position of the virtual observer windows so that the observer can maintain a view through each observer window even when moving his or her head.

The hologram bearing medium is a TFT flat screen.

The device is a television.

The device is a multimedia device.

The device is a gaming device.

The device is a medical image display device.
The device is a military information display device.
Concept A finds application in other contexts:
  A. A method of generating a holographic reconstruction of an object using a display device and a computer, the device including a light source and an optical system to illuminate a hologram-bearing medium; comprising the steps of:
    (a) using the computer to generate the hologram on the hologram-bearing medium;
    (b) arranging for the image plane of the light source to co-incide approximately with the plane of the observer's eyes to enable the observer to view the reconstruction.
  B. A data carrier programmed with data defining a video hologram, the data on the carrier being such that it causes a display device to generate holographic reconstructions according to the method of A above.
  C. A method of distributing data defining a video hologram, the data being distributed over a network and received at a display device; the data being such that it causes the display device to generate holographic reconstructions according to the method of A above.
  D. A computing device adapted to supply data defining a video hologram to a display device to cause that display device to generate holographic reconstructions according to the method of A above.
  E. A display screen when used in a display device as defined above.
  F. A holographic reconstruction generated by the device defined above.

Concept B. Large Object Reconstruction
  A display device for video holography, in which the device enables a holographic reconstruction of an object to be generated; the device including a light source and an optical system to illuminate a hologram-beating medium;
    wherein the size of the reconstructed object is determined by the size of the display and not the periodicity interval associated with the hologram-bearing medium, the periodicity interval instead determining the size of an observer window through which the reconstructed image can be seen.
Additional Features:
  the observer window is placed at the image plane of the light source.
  The device is operable such that a direct or inverse Fourier transform of the hologram is generated at an observer plane at which the observer's eyes must be placed.
  The holographic reconstruction can occur anywhere within a volume defined by the hologram and the observer window.
  There is an observer window for each eye.
  An observer window is approximately 1 cm×1 cm.
  The location of an observer's eyes are tracked and the device can alter the position of the virtual observer windows so that the observer can maintain a view through each observer window even when moving his or her head.
  The hologram bearing medium is a TFT flat screen.
  The device is a television.
  The device is a multimedia device.
  The device is a gaming device.
  The device is a medical image display device.
  The device is a military information display device.
Concept B. Finds Application on Other Contexts:
  A. A method of generating a holographic reconstruction of an object using a display device and a computer, the device including a light source and an optical system to illuminate a hologram-bearing medium; comprising the steps of:
    (a) using the computer to generate a hologram on the hologram-bearing medium;
    (b) arranging the optical system and the hologram such that the size of the reconstructed object is determined by the size of the display and not the periodicity interval associated with the hologram-bearing medium, the periodicity interval instead determining the size of a observer window through which the reconstructed object can be seen.
  B. A data carrier programmed with data defining a video hologram, the data on the carrier being such that it causes a display device to generate holographic reconstructions according to the method of A above.
  C. A method of distributing data defining a video hologram, the data being distributed over a network and received at a display device; the data being such that it causes the display device to generate holographic reconstructions according to the method of A above.
  D. A computing device adapted to supply data defining a video hologram to a display device to cause that display device to generate holographic reconstructions according to the method of A above.
  E. A display screen when used in a display device as defined above.
  F. A holographic reconstruction generated by the device as defined above.

Concept C. Calculating a Hologram from the Observer Window
  1. A method of encoding a video hologram, comprising the steps of:
    (a) selecting a point on the object to be reconstructed;
    (b) defining an observer window through which the reconstructed object will be seen;
    (c) tracing a surface from the edge of the observer window through the point and onto an area that forms only a portion of the hologram bearing medium;
    (d) encoding, onto the hologram-bearing medium, holographic information needed to reconstruct the point solely in that area.
Additional Features:
  Reconstructed object comprises multiple points.
  Encoding is such that, on reconstruction, a direct or inverse Fourier transform of the hologram is generated at a viewing plane at which the observer's eyes must be placed.
  The reconstruction can occur anywhere within a volume defined by the hologram and a virtual observer window, through which the observer can view the reconstruction.
  There is an observer window for each eye.
  An observer window is approximately 1 cm×1 cm.
  The size of the observer window is calculated as a function of the periodicity interval of the hologram.
  The location of an observer's eyes are tracked and the device can alter the position of the virtual observer windows so that the observer can maintain a view through each observer window even when moving his or her head.
  The hologram bearing medium is a TFT flat screen.
  The hologram bearing medium is the display of a television.
  The hologram bearing medium is the display of multimedia device.
  The hologram bearing medium is the display of a gaming device.
  The hologram bearing medium is the display of a medical image display device.

The hologram bearing medium is the display of a military information display device.

Concept C. Finds Application on Other Contexts:

A. A method of generating a holographic reconstruction of an object using a display device and a computer, the device including a light source and an optical system to illuminate a hologram-bearing medium; comprising the steps of:
  (a) using the computer to generate a hologram on the hologram-bearing medium; the hologram having been encoded using the method of Characteristics 1;
  (b) illuminating the hologram using the light source and optical system so that the reconstructed object is visible.

B. A data carrier programmed with data defining a video hologram, the data on the carrier having been encoded using the method defined above.

C. A method of distributing data defining a video hologram, the data being distributed over a network and received at a display device; the data having been encoded using the method defined above.

D. A computing device adapted to supply data defining a video hologram to a display device, the data having been encoded using the method defined above.

E. A display screen when used in a display device operable to display data having been encoded using the method defined above.

F. A holographic reconstruction generated from a hologram encoded using the method defined above.

Concept D. Encoding to Small Regions

A video hologram comprising a region that encodes information needed to reconstruct a single point of an object that is visible from a defined viewing position, characterised in that: the region (a) encodes information solely for that single point in the reconstructed image and (b) is the only region in the hologram to encode information for that point, and is restricted in size to form a portion of the entire hologram, the size being such that multiple reconstructions of that point caused by higher diffraction orders are not visible at the defined viewing position.

Additional Features:
  Encoding is such that, on reconstruction, a direct or inverse Fourier transform of the hologram is generated at a viewing plane at which the observer's eyes must be placed.
  The reconstruction can occur anywhere within a volume defined by the hologram and a virtual observer window, through which the observer can view the reconstruction.
  An observer window is approximately 1 cm×1 cm.
  There is an observer window for each eye.
  The size of the observer window is calculated as a function of the periodicity interval of the hologram.
  The location of an observer's eyes are tracked and the device can alter the position of the virtual observer windows so that the observer can maintain a view through each observer window even when moving his or her head.
  Reconstructed object comprises multiple points.
  The hologram is encoded onto a hologram-bearing medium that is a TFT flat screen.
  The hologram is encoded onto a display in a television.
  The hologram is encoded onto a display in a multimedia device.
  The hologram is encoded onto a display in a gaming device.
  The device is a medical image display device.
  The device is a military information display device.

Concept D Finds Application in Other Contexts:

A. A method of encoding a video hologram that can reconstruct a point of an object, comprising the step of:
  encoding into a region of the hologram information solely for that single point, the region being the only region in the hologram to encode information for that point, and being restricted in size to form a small portion of the entire hologram, the size being such that multiple reconstructions of that point caused by higher diffraction orders are not visible at a defined viewing position.

B. A data carrier programmed with data defining a video hologram, the data on the carrier being such that it causes a display device to generate a hologram as defined above.

C. A method of distributing data defining a video hologram, the data being distributed over a network and received at a display device; the data being such that it causes the display device to generate a hologram as defined above.

D. A computing device adapted to supply data defining a video hologram to a display device to cause that display device to generate a hologram as defined above.

E. A display screen when displaying a hologram as defined above.

F. A holographic reconstruction when generated from a hologram as defined above.

G. A display device adapted to generate a holographic reconstruction, the device including a display encoded with a hologram as defined above.

Concept E. Time Sequential Encoding

A display device for computer generated holography, in which the device enables a holographic reconstruction of an object to be viewed; the device including a light source and an optical system to illuminate a hologram-bearing medium;
  wherein the device is operable to time sequentially re-encode a hologram on the hologram-bearing medium for the left and then the right eye of an observer.

Additional Features:
  The reconstruction is the Fresnel transform of the hologram.
  The device is operable such that a direct or inverse Fourier transform of the hologram is generated at a viewing plane at which the observer's eyes must be placed.
  The holographic reconstruction can occur anywhere within a volume defined by the hologram and a virtual observer window formed on the image plane, through which the observer can view the reconstruction.
  There is an observer window for each eye.
  An observer window is approximately 1 cm×1 cm.
  The location of an observer's eyes are tracked and the device can alter the position of the virtual observer windows so that the observer can maintain a view through each observer window even when moving his or her head.
  The hologram bearing medium is a TFT flat screen.
  The device is a television.
  The device is a multimedia device.
  The device is a gaming device.
  The device is a medical image display device.
  The device is a military information display device.

Concept E Finds Application in Other Contexts:

A. A method of generating a holographic reconstruction of an object using a display device and a computer, the device including a light source and an optical system to illuminate a hologram-bearing medium; comprising the steps of:
  (a) time sequentially re-encoding a hologram on the hologram-bearing medium for the left and then the right eye of an observer.

B. A data carrier programmed with data defining a video hologram, the data on the carrier being such that it causes a display device to generate holographic reconstructions according to the method defined at A above.

C. A method of distributing data defining a video hologram, the data being distributed over a network and received at a display device; the data being such that it causes the display device to generate holographic reconstructions according to the method defined at A above.

D. A computing device adapted to supply data defining a video hologram to a display device to cause that display device to generate holographic reconstructions according to the method defined at A above.

E. A display screen when used in a display device as defined at D above.

F. A holographic reconstruction generated by the device defined at D above.

The invention claimed is:

1. A method of generating a holographic reconstruction of an object on the principle of a Fourier hologram using a display device and a computer, the display device including a light source, an optical system and a spatial light modulator, the optical system illuminates the spatial light modulator, the optical system images the light source into an observer plane, and the holographic reconstruction of the object being visible by the observer if the observer's eyes are placed at the observer plane; the method comprising the step of:

using the computer to encode a hologram on the spatial light modulator, the computer calculating the hologram such that the holographic reconstruction of the object is visible by the observer behind the spatial light modulator when observed by the observer at the observer plane.

2. The method of claim 1 wherein the hologram is computed by calculating wavefronts that would be generated by the object to be reconstructed, when those wavefronts are at the approximate position at which an observer places his eyes.

3. The method of claim 2 wherein the wavefronts are reconstructed by the hologram.

4. The method of claim 2 wherein the wavefronts are calculated for one or more observers windows.

5. The method of claim 4 comprising the further step of generating a holographic reconstruction of an object using a display device and a computer, the device including a light source and an optical system to illuminate a SLM; the method of generating comprising the steps of:

(a) using the computer to generate a hologram on the SLM;
(b) arranging the optical system and the hologram such that the size of the reconstructed object is a function of the size of the display and not the periodicity interval associated with the SLM, the periodicity interval instead determining the size of the observer window through which the reconstructed object can be seen.

6. The method of claim 2 adapted to reconstruct a point of the object, comprising the step of:

encoding into a region of the hologram information solely for that single point, the region being the only region in the hologram to encode information for that point, and being restricted in size to form a small portion of the entire hologram, the size being such that multiple reconstructions of that point caused by higher diffraction orders are not visible at the observer eye position.

7. The method of claim 6 comprising the further steps of:
(a) selecting a point on the object to be reconstructed;
(b) defining the observer window through which the reconstructed object will be seen;
(c) tracing a pyramid from the edges of the observer window through the point and onto an area that forms only a portion of a SLM;
(d) encoding, onto the SLM, solely in that area, holographic information needed to reconstruct the point.

8. The method of claim 2 comprising the further step of generating a holographic reconstruction of an object using a display device and a computer, the device including a light source and an optical system to illuminate a SLM; comprising the steps of:

(a) using the computer to generate the hologram on the SLM;
(b) arranging for the image plane to approximately coincide with the plane of the observer's eyes so that the observer can view the reconstruction.

9. The method of claim 2 comprising the further step of generating a holographic reconstruction of an object using a display device and a computer, the device including a light source and an optical system to illuminate a SLM; comprising the step of:

(a) time sequentially re-encoding a hologram on the SLM for the left and then the right eye of an observer.

10. The method of claim 2 in which encoding is such that, on reconstruction, a direct or inverse Fourier transform of the hologram is generated at an observer plane at which the observer's eyes must be placed.

11. The method of claim 2 in which the reconstruction can occur anywhere within a volume defined by the hologram and a virtual observer window, through which the observer can view the reconstruction.

12. The method of claim 2 in which the hologram is encoded onto a SLM that is a TFT flat screen.

13. The method of claim 2 in which the hologram is encoded onto a display in a television.

14. The method of claim 2 in which the hologram is encoded onto a display in a multimedia device.

15. The method claim 2 in which the hologram is encoded onto a display in a gaming device.

16. The method of claim 1 in which the display device is a medical image display device.

17. The method of claim 1 in which the display device is a military information display device.

18. A data carrier programmed with holographic data, when used in combination with a device being adapted to compute a hologram from that data using the method of claim 1.

19. A data distribution network when carrying holographic data that are adapted to be processed by a device to compute a hologram using the method of claim 1.

20. A computing device adapted to compute data defining a video hologram using the method of claim 1.

21. A display screen when displaying a hologram computed by the method of claim 1.

22. A holographic reconstruction from a hologram computed by the method of claim 1.

23. A method of generating a holographic reconstruction of an object on the principle of a Fourier hologram using a display device and a computer, the display device including a light source, an optical system and a spatial light modulator, the optical system illuminates the spatial light modulator, the optical system images the light source into an observer plane, and the holographic reconstruction of the object being visible by the observer if the observer's eyes are placed at the observer plane; the method comprising the step of:

using the computer to encode a hologram on the spatial light modulator, the computer calculating the hologram by considering optical properties of the display device such that the holographic reconstruction of the object is visible by the observer on a side of the spatial light modulator opposite to the observer plane.

* * * * *

UNITED STATES PATENT AND TRADEMARK OFFICE
CERTIFICATE OF CORRECTION

PATENT NO. : 8,804,220 B2
APPLICATION NO. : 11/313989
DATED : August 12, 2014
INVENTOR(S) : Leister et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this
Eleventh Day of August, 2015

Michelle K. Lee
*Director of the United States Patent and Trademark Office*